US012785932B2

(12) United States Patent
Sunkavally

(10) Patent No.: US 12,785,932 B2
(45) **Date of Patent: *Nov. 3, 2026**

(54) LOW-COMPUTE, PRIVACY PRESERVING HASH CRACKING

(71) Applicant: Horizon 3 AI, Inc., Dover, DE (US)

(72) Inventor: Naveen Naga Sunkavally, Cary, NC (US)

(73) Assignee: Horizon 3 AI, Inc., Dover, DE (US)

( * ) Notice: Subject to any disclaimer, the term of this patent is extended or adjusted under 35 U.S.C. 154(b) by 45 days.

This patent is subject to a terminal disclaimer.

(21) Appl. No.: 18/913,605

(22) Filed: Oct. 11, 2024

(65) Prior Publication Data

US 2025/0132896 A1 Apr. 24, 2025

Related U.S. Application Data

(63) Continuation of application No. 18/383,320, filed on Oct. 24, 2023.

(51) Int. Cl.
*H04L 9/06* (2006.01)

(52) U.S. Cl.
CPC .......... *H04L 9/0643* (2013.01); *H04L 9/0618* (2013.01)

(58) Field of Classification Search
CPC ... H04L 9/0643; H04L 9/0618; H04L 9/3228; H04L 9/3239; G06F 21/46
See application file for complete search history.

(56) References Cited

U.S. PATENT DOCUMENTS

| | | | | |
|---|---|---|---|---|
| 8,817,981 | B2 * | 8/2014 | Fiske | G06F 21/46 713/184 |
| 9,230,075 | B1 * | 1/2016 | Robinson | H04L 63/083 |
| 2016/0292685 | A1 * | 10/2016 | Kairi | G06F 21/36 |
| 2021/0091938 | A1 * | 3/2021 | Lurey | H04L 9/3218 |

OTHER PUBLICATIONS

"New Technologies in Password Cracking Techniques" p. 179-197; by Sudhir Aggarwal, Shiva Houshmand and MattWeir (Year: 2018).*
Anonymous: "A Quick Look at MDXFIND", Oct. 11, 2019 (Oct. 11, 2019), pp. 1-5, XP093241837, Wayback Machine, retrieved from the internet: URL:https://web.archive.org/web/20230602153825/https://www.digitalforensictips.com/2019/10/a-quick-look-at-mdxfind.html [retrieved on Jan. 21, 2025], p. 1-p. 3.

(Continued)

*Primary Examiner* — Mohammed Waliullah
(74) *Attorney, Agent, or Firm* — Flare IP PLLC

(57) ABSTRACT

Clear text passcodes are recovered from hashed versions of passcodes in a computational efficient and privacy preserving manner. A service provider computes an initial hash of clear text passcodes in a wordlist, computes a subsequent hash on top of the initial hash, and groups or bins the clear text passcodes based on a portion (e.g., prefix) of their subsequent hashes. A client computes a subsequent hash of a hashed passcode to be cracked, and sends a request specifying a portion of the subsequent hash to the service provider. The service provider returns a set of clear text passcodes whose hash of a hash has a match with the specified portion. The client locally computes the initial hash of clear text passcodes in the returned set, and determines if any of the resulting hashes match the hashed passcode to be cracked, and if so the passcode is considered cracked.

24 Claims, 14 Drawing Sheets

(56) References Cited

OTHER PUBLICATIONS

Sharma, Himanshu: "Crackstation—Kali-Linux—An Ethical Hacker's Cookbook", Apr. 8, 2022 (Apr. 8, 2022), pp. 1-4, XP093241857, Wayback Machine Retrieved from the Internet: URL:https://web.archive.org/web/20220408015617/https://www.oreilly.com/library/view/ kali-linux/9781787121829/69d66516-5f6b-4a8a-85b7-cd56857cfc69.xhtml [retrieved on Jan. 21, 2025], p. 1-p. 2.
Anonymous: "hashcat [hashcat wiki]", Oct. 7, 2023 (Oct. 7, 2023), pp. 1-12, XP093241521, Wayback Machine Retrieved from the Internet: URL:https://web.archive.org/web/2023100713 4429/https://hashcat.net/wiki/doku.php?id=hashcat#options [retrieved on Jan. 21, 2025], p. 4.
Demir, Levent, et al.: "The Pitfalls of Hashing for Privacy", IEEE Communications Surveys & Tutorials, vol. 20, No. 1, Jan. 1, 2018 (Jan. 1, 2018), pp. 551-565, XP011678432,DOI: 10.1109/COMST.2017.2747598 [retrieved on Feb. 23, 2018], figures 2,3.
ISA/EP, International Search Report and Written Opinion mailed Jan. 30, 2025, Int'l App. No. PCT/US2024/052667 filed Oct. 23, 2024, 14 pages.
Aggarwal, S.; Houshmand, S.; and Weir, M., "New Technologies in Password Cracking Techniques," 2018, pp. 179-197.

* cited by examiner

LOW-COMPUTE, PRIVACY PRESERVING HASH CRACKING

CROSS-REFERENCE

This application is a continuation of U.S. patent application Ser. No. 18/383,320, filed Oct. 24, 2023, entitled "LOW-COMPUTE, PRIVACY PRESERVING HASH CRACKING," which is incorporated herein by reference.

BACKGROUND

Field

This disclosure generally relates to recovery of clear text (aka, cleartext) passcodes (e.g., passwords, passphrases) from hashed versions of passcodes in a computational efficient and privacy preserving manner.

Description of the Related Art

A passcode is a string of characters (e.g., alpha characters, numeric characters, and/or special characters or symbols), that a user typically maintains as a secret, that may be used to authenticate a transaction, access an account or otherwise authenticate a user. The string of characters typically complies with a defined format requirement for a given application (e.g., minimum length, maximum length, inclusion of a minimum number of each two or more different types of characters). A passcode may comprise a password or a passphrase, which allows the passcode to be easily remembered by a human. In other instances, the passcode can be a randomly or pseudo-randomly generated string of characters.

Clear text (aka cleartext) is any information that is unencrypted, although that information might be in an encoded form that is not easily human-readable (e.g., base64 encoding). Clear text has not been subject to encryption. Plain text (aka plaintext) is information before that information is fed into a cryptographic algorithm (e.g. cipher or encryption algorithm), which can even include already encrypted information (e.g., encrypted text; encrypted character strings). In many instances, a cryptographic algorithm can execute hashing, generating a hash of the input (e.g., clear text, plain text). Hashing is a "one-way" function, and it is generally not mathematically feasible to directly compute a clear text passcode from its hashed version. Hashing can employ an unsalted hashing function or a salted hashing function.

Hash cracking is the recovery a clear text passcode from a hashed version of the clear text passcode. Hash cracking is a practice commonly used by cyber attackers carrying out certain types of cyberattacks. Hash cracking is also a practice commonly used by information security professionals in order to prevent cyberattacks.

In order to recover a clear text passcode from a hashed passcode, hashes for many potential passcodes from a set of passcodes (e.g., "wordlist" of potentially quadrillions of entries) are computed and compared to the hash of the passcode that is trying to be recovered or cracked. The passcode is considered "cracked" if there is a match between a hash of the passcode to be cracked and one of the hashes from the set of hashed passcodes (e.g., "wordlist").

Hash cracking can be provided as a service to users, for example in a server-client network environment.

Such a service can, for example, employ purchasing and setting up resource intensive hardware, for example with graphics processing units (GPUs) and running special hash cracking tools (e.g., Hashcat, see www.hashcat.net) to take advantage of the computational speed offered by the particular hardware (e.g., GPUs). These tools compute the hashes of lots of potential passwords from a wordlist on the fly, and compare the computed hashes to the hash of the password that is trying to be recovered ("cracked").

Alternatively, such a service can, for example, employ the use of "rainbow tables" which are pre-computed tables on the order of billions of potential passcodes. Some online services (e.g., Crackstation, see www.crackstation.net) allow users to submit a passcode hash, and a server computing system will perform a fast lookup to see if that hash matches one that has already been pre-computed, and if so, return the corresponding recovered or "cracked" passcode.

The former approach generally scales better as the size of the "wordlist" grows, whereas under the later approach the size of the rainbow table would eventually become infeasible to store. However the former approach incurs the significant cost of the specialized hardware.

BRIEF SUMMARY

Both of the above described approaches disadvantageously have users submit their passcode hashes to the service provider "in the clear" and this means that the users are relying on or trusting the server or service provider to not do anything malicious with the password hash.

A more secure and computationally efficient approach to passcode recovery or hash cracking is desirable.

In at least one aspect, various implementations described herein can be denominated as hash cracking using K-anonymity.

A high level example is provided in this Summary for illustrative purposes. This high level example is not intended to be limiting, but rather to provide a readily understandable illustrative example of a particular implementation.

For the purpose of this illustrative example, it is assumed that a user wants to crack a specific type of passcode hash. For this illustrative example, we assume that the hash is NTLM (MD4), which is commonly used in Windows® environments and Microsoft® Active Directory Services. It is noted that this is an unsalted hash. Since storing a rainbow table for salted hashes can be cost prohibitive, this illustrative example works best for unsalted hashes. However, the same or a similar approach can be employed with salted hashes.

A service provider can provide a service to crack a particular type of hash (e.g., NTLM hashes). The service provider (e.g., service provider backend computing system or service provider server computing system) generates and/or stores a set of potential clear text passcodes of arbitrary size. The set of potential clear text passcodes is denominated herein as a "wordlist" although such includes, in addition to standard words, other strings of characters (e.g., alpha characters, numeric characters, and/or special characters or symbols) that are not strictly words and/or are not found in a standard dictionary). Thus, the term "wordlist" as used herein is not limited to words or words found in dictionaries, but extends to any set of character strings. This "wordlist" can, for example, include billions of potential clear text passcode entries.

The service provider (e.g., service provider backend computing system or service provider server computing system) computes a first or initial hash (e.g., NTLM hash) of each potential clear text passcode in the wordlist. Then, on top of the first or initial hash (e.g., NTLM hash), the service provider (e.g., service provider backend computing system or service provider server computing system) computes a second or subsequent hash (e.g., a SHA256 hash) on the first or previous hash. A defined portion (e.g. the prefix, for instance the first 5 hexadecimal characters) of the second hashes are identified or taken. For example, SHA256 (NTLM (passcode)) is computed for each potential clear text passcode, and the first 20 bits (i.e., 5 characters hexadecimal) of each computed hash is taken as a prefix.

The potential clear text passcodes in the wordlist are grouped (binned) based on defined portion of their respective second or subsequent hash (e.g., the computed prefix). For example, for a wordlist with 2.3 billion entries, and with a 20 bit (5 characters hexadecimal) prefix, each bin contains roughly 2200 passcodes.

The service provider sets up a service, for example via a service provider server computing system, that when presented with defined portions of an output of a second or subsequent hashing (e.g., presented with a 5 character hexadecimal prefix), returns a set (e.g., a bin) with all matching clear text passcodes.

Where a user would like to crack a given hashed passcode (e.g., a passcode hashed via a given type of hash function, for instance an NTLM hash function), the user provides the hashed passcode (i.e., hashed via a first or initial hash function) to a local client (e.g., a web browser running JavaScript and executing on a client computing system that is local to the user). The client computing system computes a second or subsequent hash (e.g., SHA256 hash) on the first or previously hashed passcode (e.g., NTLM hashed passcode) and takes a defined set of characters (e.g., the first 5 hex characters as the prefix) of the resulting second or subsequent hashed passcode that results from the second or subsequent hashing. The client computing system submits the defined set of characters (e.g., prefix) to the server computing system, which returns a set or bin with potential clear text passcodes whose hash (e.g., SHA256 (NTLM) hash) prefix match the prefix submitted by the client computing system.

The client computing system locally computes the first or initial hash (e.g., the NTLM hash) of all clear text entries in the set (e.g., bin) returned by the service provider server computing system. If any of the resulting hashes (e.g., NTLM hashes) of the clear text passcodes match the hashed passcode (e.g., NTLM hashed passcode) that was submitted by the client computing system, the passcode is considered cracked.

In this approach, the user is advantageously using an online service and does not need to locally store billions/trillions of passcodes, saving on computing resources and well as reducing demands on communications infrastructure (e.g., network resources). This approach can also reduce the computational resources employed allowing the user to operate without specialized hardware (GPUs) for cracking the hashes. Such specialized hardware can be completely avoided, or a smaller quantity can be employed since the operations that take advantage of the computational speeds offered by such specialized hardware can be centralized (e.g., at the service provider or backend or server computing system). Also, the online service advantageously centrally maintains the wordlist over time, allowing the wordlist to grow over time without taxing local computing resources and/or communications resources.

Under the described approaches, the user advantageously does not need to submit the initial, first or previous hash of the passcode (e.g., NTLM hashed passcode) in the clear to the service provider or server computing system. Only a portion (e.g., the first 20 bits or first 5 characters hexadecimal or prefix) of a second or subsequent hash (e.g., SHA256 hash, which is 256 bits) of the hashed passcode are sent to the server computing system. The computation of whether a passcode was cracked advantageously occurs at the client computing system, local to the user. Thus, even if the service provider or server computing system logs all the queries coming in to it, there is no way for the service provider or server computing system to discern the initial, first or previous hashed passcode (NTLM hashed passcode) from the portion (e.g., first 20 bits of a SHA256 hash) of the second or subsequent hash that is submitted to the server computing system by the user or client computing system. Thus, the approaches described herein advantageously enhance security.

While the above illustrative example describes cracking an NTLM hash using an SHA256 hash for computing a prefix, and a 5 character hexadecimal prefix, all of these parameters can vary in a real world implementation. Thus, other hashing functions can be employed, and other sets of defined characters used to bin the clear text passcodes.

Moreover the hash which is used for the binning (e.g., in the example the SHA256 hash from which the prefix is drawn) is not limited to application of a single hash, but could operate with multiple levels of hashing, for example performing a SHA256 hash of a SHA256 has of a SHA256 hash, etc.

Additionally, the data stored in each set or bin and provided by the server computing system to the client computing system can optionally include metadata associated with each clear text passcode. For instance, the first, initial or previous hash (e.g., NTLM hash) of the passcode of each potential clear text passcode can be stored alongside or otherwise logically associated with the respective clear text passcode, allowing the client computing system to avoid re-computing the first, initial or previous hashes (e.g., NTLM hash) of the clear text passcodes returned (e.g., returned bin of clear text passcodes). Thus, the client computing system could simply compare the returned first, initial or previous hashes (e.g., NTLM hashes) with the hashed passcode (e.g., NTLM hashed passcode) to be cracked.

The implementations described herein can advantageously provide security professionals (e.g. red teasers and red team members) a secure online service to submit hashes to be cracked. The implementations described herein advantageously alleviates any concerns of security professionals since the server computing system never has access to the hashed password itself.

The information security teams at companies commonly try to crack their employees' passcodes to make sure the passcodes are strong and cannot be guessed by cyber attackers. Any crackable passcodes are a security risk. The implementations described herein can advantageously allow security teams to dump the hashes for all of their employees and use this solution to attempt to crack those passcodes, without having to purchase any specialized hardware or having to worry about the security of a conventional online cracking service.

Thus, the implementations described herein can advantageously perform hash cracking while ensuring privacy and without specialized hardware.

BRIEF DESCRIPTION OF THE DRAWINGS

In the drawings, identical reference numbers identify similar elements or acts. The sizes and relative positions of elements in the drawings are not necessarily drawn to scale.

For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1A:
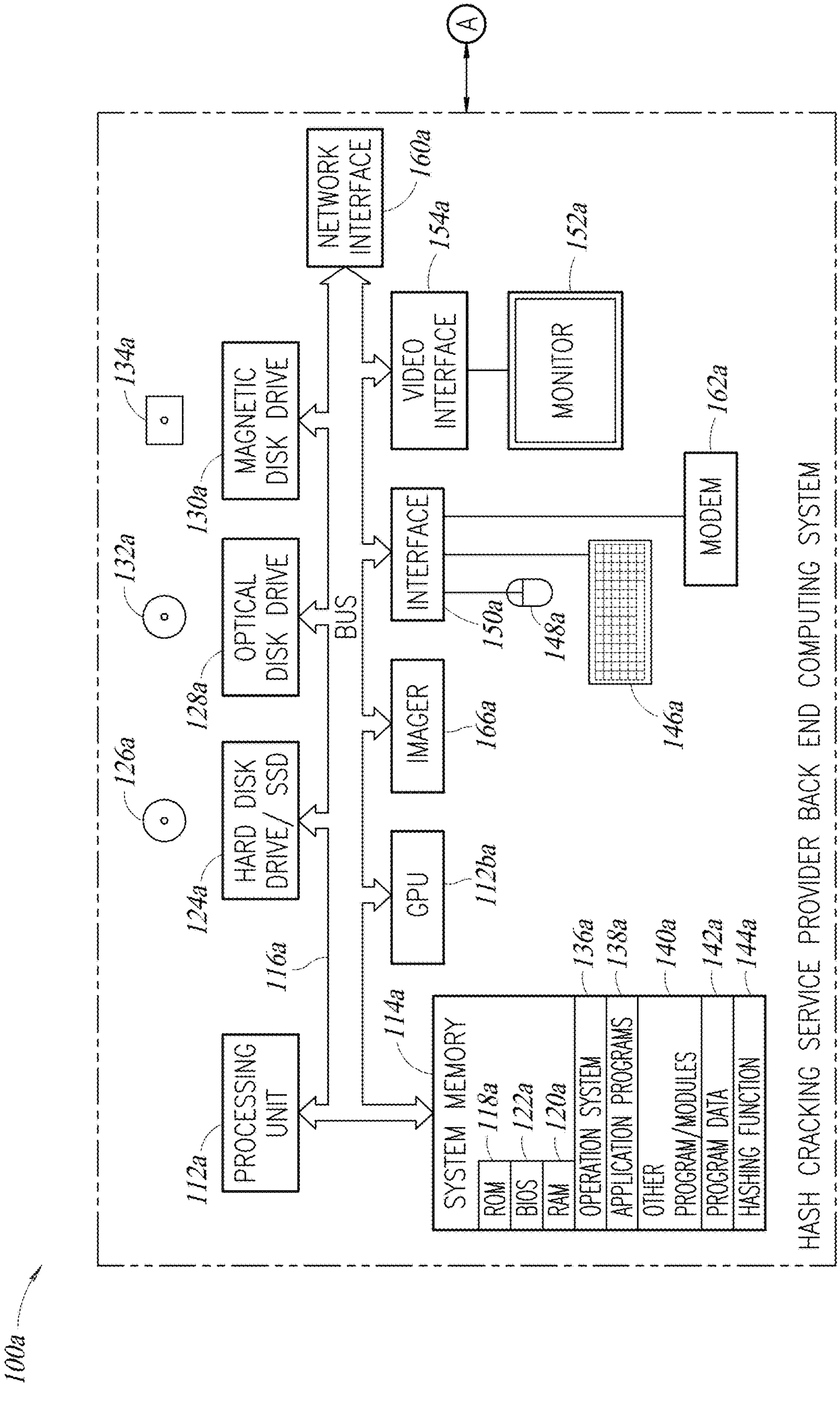
FIGS. 1A, 1B, 1C and 1D are a block diagram of networked computational environment, in which systems, devices and methods for hash cracking are implemented, the networked computational environment including a hash cracking service provider back end computing system, a hash cracking service provider server computing system, and a plurality of client computing systems (two shown), according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

FIGS. 1A, 1B, 1C and 1D show a networked computational environment, in which systems, devices and methods for hash cracking are implemented, the networked computational environment including a hash cracking service provider back end computing system 100*a*, a hash cracking service provider server computing system 100*b*, and a plurality of client computing systems 100*c*, 100*d*, according to one illustrated embodiment.

The hash cracking service provider back end computing system 100*a* is suitable for implementing aspects of the hash cracking services described herein, for example computing a hash on a hash of a passcode and segregating or binning clear text passcodes accordingly, with or without associated metadata. The hash cracking service provider server computing system 100*b* is suitable for implementing aspects of the hash cracking services described herein, for example receiving and servicing inquiries or requests for hash cracking services that specify a defined portion of a hash of a hash of a passcode to be cracked, retrieving a set or bin of corresponding clear text passcodes and/or associated metadata and returning the same in response to the inquiry or request. The client computing systems 100*c*, 100*d* is suitable for implementing aspects of the hash cracking services described herein, for example hashing a hashed passcode to be cracked, identifying a defined portion of the hash of the hashed passcode to be cracked, sending an inquiry or request specifying the portion; receiving a set or bin of corresponding clear text passcodes and/or associated metadata, hashing the clear text passcodes in the set or bin and determining whether a resulting hash matches the hash of the passcode to be cracked.

The various computing systems will at times be referred to in the singular herein, but this is not intended to limit the embodiments to a single device or system, since in typical embodiments there may be more than one computing system or device performing any given function, for example to distribute workload. Additionally, while the hash cracking service provider back end computing system 100*a* and the hash cracking service provider server computing system 100*b* are illustrated and described as separate computing systems, in some implementations a computing system can be employed that provides the operations of both the hash cracking service provider back end computing system 100*a* and the hash cracking service provider server computing system 100*b*.

The hash cracking service provider back end computing system 100*a* may include one or more processing units 112*a* (two shown), a system memory 114*a* and a system bus 116*a* that couples various system components including the system memory 114*a* to the processing units 112*a*. The processing units 112*a* may be any logic processing unit, such as one or more central processing units (CPUs), digital signal processors (DSPs), graphics processing units, application-specific integrated circuits (ASICs), field programmable gate arrays (FPGAs), etc. The system bus 116*a* can employ any known bus structures or architectures, including a memory bus with memory controller, a peripheral bus, and a local bus. The system memory 114*a* includes read-only memory ("ROM") 118*a* and random access memory ("RAM") 120*a*. A basic input/output system ("BIOS") 122*a*, which can form part of the ROM 118*a*, contains basic routines that help transfer information between elements within the hash cracking service provider back end computing system 100*a*, such as during start-up.

The hash cracking service provider back end computing system 100*a* may also include a plurality of interfaces such as network interface 160*a*, interface 150*a*, supporting modem 162*a* or any other wireless/wired interfaces.

The hash cracking service provider back end computing system 100*a* may include a hard disk drive 124*a* for reading from and writing to a hard disk 126*a*, an optical disk drive 128*a* for reading from and writing to removable optical disks 132*a*, and/or a magnetic disk drive 130*a* for reading from and writing to magnetic disks 134*a*. The optical disk 132*a* can be a CD-ROM or DVD-ROM, while the magnetic disk 134*a* can be any magnetic storage media. The hard disk drive 124*a*, optical disk drive 128*a* and magnetic disk drive 130*a* may communicate with the processing unit 112*a* via the system bus 116*a*. The hard disk drive 124*a*, optical disk drive 128*a* and magnetic disk drive 130*a* may include interfaces or controllers (not shown) coupled between such drives and the system bus 116*a*, as is known by those skilled in the relevant art. The drives 124*a*, 128*a* and 130*a*, and their associated computer-readable storage media 126*a*, 132*a*, 134*a*, may provide nonvolatile and non-transitory storage of computer readable instructions, data structures, program modules and other data for the hash cracking service provider back end computing system 100*a*. Although the depicted hash cracking service provider back end computing system 100*a* is illustrated employing a hard disk or SSD 126*a*, optical disk 132*a* and magnetic disk 130*a*, those skilled in the relevant art will appreciate that other types of computer-readable storage media that can store data accessible by a computer may be employed, such as flash memory, digital video disks ("DVD"), Bernoulli cartridges, RAMs, ROMs, smart cards, various solid state drives, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic storage devices, solid state memory or any other medium which can be used to store the desired information and which may be accessed by processing unit(s) 112*a*.

Program modules can be stored in the system memory 114*a*, such as an operating system 136*a*; one or more application programs 138*a*; other programs or modules 140*a*; program data (e.g., data store with one or more data structures which include sets or bins of clear text passcodes and optionally include associated metadata) 142*a*; and hashing functions 144*a*. Application programs 138*a* along with the program data 142*a*, and hashing functions 144*a*, may include processor-executable instructions and data that cause the processor(s) 112*a* to execute the various algorithms described herein. The application program(s) 138*a* can, for example, compute a hash on a hash of a passcode in conjunction with the hashing functions 144*a*, and segregate or bin clear text passcodes accordingly (e.g., based on a prefix or other portion of the resulting hash), with or without associated metadata, into a data store saved as program data 142*a* and shared with or otherwise made available to hash cracking service provider server computing system 100*b*. Other program modules 140*a* may include instructions for handling security such as password or other access protection and communications encryption in addition to the hashing and hash cracking generally described herein. The system memory 114*a* may also include communications programs, for example, a Web client or browser as part of the application programs 138*a* for permitting the hash cracking service provider back end computing system 100*a* to access and exchange data with sources such as Web sites of the Internet, corporate intranets, extranets, or other networks and devices as described herein, as well as other server applications on server computing systems.

While shown in FIG. 1A as being stored in the system memory 114*a*, the operating system 136*a*, application programs 138*a*, other programs/modules 140*a*, program data 142*a*, and hashing functions 144*a* can be stored on the hard disk 126*a* of the hard disk drive 124*a*, the optical disk 132*a* of the optical disk drive 128*a* and/or the magnetic disk 134*a* of the magnetic disk drive 130*a*, or other memory storage devices, such as solid state drives. In at least some implementations, the hashing functions 144*a* can be implemented in a standalone or a dedicated device (e.g., dedicated processor) that accepts input and generates output without providing access to any hashing algorithms, in order to ensure security of the hashing functions.

An operator, such as a user, can enter commands and information into the hash cracking service provider back end computing system 100*a* through input devices such as a touch screen or keyboard 146*a*, an imager 166*a*, a pointing device such as a mouse 148*a*, and/or via a graphical user interface. Other input devices can include a touchpad, microphone, joystick, game pad, tablet, scanner, etc. These and other input devices are connected to one or more of the processing units 112*a* through an interface 150*a* such as a serial port interface that couples to the system bus 116*a*, although other interfaces such as a parallel port, a game port or a wireless interface or a universal serial bus ("USB") can be used. A monitor 152*a* or other display device is coupled to the system bus 116*a* via a video interface 154*a*, such as a video adapter. The hash cracking service provider back end computing system 100*a* can include other output devices, such as speakers, printers, etc.

The hash cracking service provider back end computing system 100*a* can operate in a networked environment using logical connections to one or more remote computers and/or devices associated with hash cracking operations. For example, the hash cracking service provider back end computing system 100*a* can operate in a networked environment using logical connections to one or more mobile devices, landline telephones and other service providers or information servers associated with the hash cracking operations as described above with reference to FIG. 1A. Communications may be via a wired and/or wireless network architecture, for instance wired and wireless enterprise-wide computer networks, intranets, extranets, telecommunications networks, cellular networks, paging networks, and other mobile networks.

The hash cracking service provider server computing system 100*b* may include one or more processing units 112*b* (two shown), a system memory 114*b* and a system bus 116*b* that couples various system components including the system memory 114*b* to the processing units 112*b*. The processing units 112*b* may be any logic processing unit, such as one or more central processing units (CPUs), digital signal processors (DSPs), graphics processing units, application-specific integrated circuits (ASICs), field programmable gate arrays (FPGAs), etc. The system bus 116*b* can employ any known bus structures or architectures, including a memory bus with memory controller, a peripheral bus, and a local bus. The system memory 114*b* includes read-only memory ("ROM") 118*b* and random access memory ("RAM") 120*b*. A basic input/output system ("BIOS") 122*b*, which can form part of the ROM 118*b*, contains basic routines that help transfer information between elements within the hash cracking service provider server computing system 100*b*, such as during start-up.

The hash cracking service provider server computing system 100*b* may also include a plurality of interfaces such as network interface 160*b*, interface 150*b*, supporting modem 162*b* or any other wireless/wired interfaces.

The hash cracking service provider server computing system 100*b* may include a hard disk drive 124*b* for reading from and writing to a hard disk 126*b*, an optical disk drive 128*b* for reading from and writing to removable optical disks 132*b*, and/or a magnetic disk drive 130*b* for reading from and writing to magnetic disks 134*b*. The optical disk 132*b* can be a CD-ROM or DVD-ROM, while the magnetic disk 134*b* can be any magnetic storage media. The hard disk drive 124*b*, optical disk drive 128*b* and magnetic disk drive 130*b* may communicate with the processing unit 112*b* via the system bus 116*b*. The hard disk drive 124*b*, optical disk drive 128*b* and magnetic disk drive 130*b* may include interfaces or controllers (not shown) coupled between such drives and the system bus 116*b*, as is known by those skilled in the relevant art. The drives 124*b*, 128*b* and 130*b*, and their associated computer-readable storage media 126*b*, 132*b*, 134*b*, may provide nonvolatile and non-transitory storage of computer readable instructions, data structures, program modules and other data for the hash cracking service provider server computing system 100*b*. Although the depicted hash cracking service provider server computing system 100*b* is illustrated employing a hard disk or SSD 126*b*, optical disk 132*b* and magnetic disk 130*b*, those skilled in the relevant art will appreciate that other types of computer-readable storage media that can store data accessible by a computer may be employed, such as flash memory, digital video disks ("DVD"), Bernoulli cartridges, RAMs, ROMs, smart cards, various solid state drives, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic storage devices, solid state memory or any other medium which can be used to store the desired information and which may be accessed by processing unit(s) 112*b*.

Program modules can be stored in the system memory 114*b*, such as an operating system 136*b*; one or more application programs 138*b* (e.g., Web server applications, database applications); other programs or modules 140*b*; program data 142*b*; and optionally hashing functions 144*b*. Application programs 138*b* along with the program data 142*b*, and optionally hashing functions 144*b*, may include processor-executable instructions and data that cause the processor(s) 112*b* to execute the various algorithms described herein. The application programs 138*b* can, for example, implement one or more servers (e.g., Web servers) operable to receive inquiries or requests from client computing systems 100*c*, 100*d*, retrieve corresponding sets or bins of clear text passcodes and/or associated metadata, and return such in response to the received inquiry or request. While illustrated and described as a sever (e.g., Web server), the application programs 138*b* can take other forms that allow inquiries to be made and corresponding sets or bins of data retrieved and returned. Other program modules 140*b* may include instructions for handling security such as password or other access protection and communications encryption in addition to the hashing and hash cracking generally described herein. The system memory 114*b* may also include communications programs, for example, a Web client or browser as part of the application programs 138*b* for permitting the hash cracking service provider server computing system 100*b* to access and exchange data with sources such as Web sites of the Internet, corporate intranets, extranets, or other networks and devices as described herein, as well as other server applications on other server computing systems.

Figure 1B:
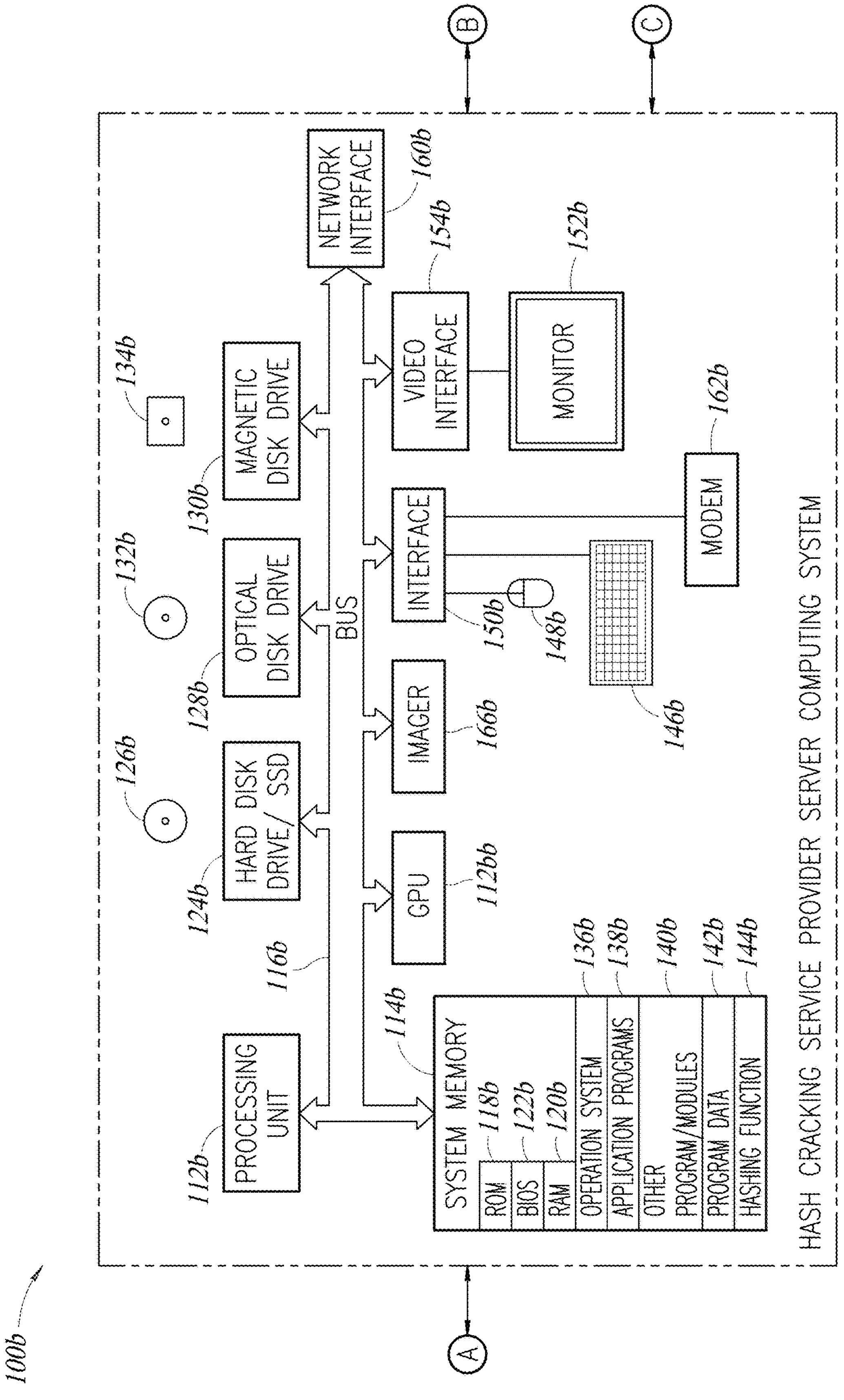

While shown in FIG. 1B as being stored in the system memory 114*b*, the operating system 136*b*, application programs 138*b*, other programs/modules 140*b*, program data 142*b*, and hashing functions 144*b* can be stored on the hard disk 126*b* of the hard disk drive 124*b*, the optical disk 132*b* of the optical disk drive 128*b* and/or the magnetic disk 134*b* of the magnetic disk drive 130*b*, or other memory storage devices, such as solid state drives. In at least some implementations, the optional hashing functions 144*b* can be implemented in a standalone or a dedicated device (e.g., dedicated processor) that accepts input and generates output without providing access to any hashing algorithms, in order to ensure security of the hashing functions.

An operator, such as a user, can enter commands and information into the hash cracking service provider server computing system 100*b* through input devices such as a touch screen or keyboard 146*b*, an imager 166*b*, a pointing device such as a mouse 148*b*, and/or via a graphical user interface. Other input devices can include a touchpad, microphone, joystick, game pad, tablet, scanner, etc. These and other input devices are connected to one or more of the processing units 112*b* through an interface 150*b* such as a serial port interface that couples to the system bus 116*b*, although other interfaces such as a parallel port, a game port or a wireless interface or a universal serial bus ("USB") can be used. A monitor 152*b* or other display device is coupled to the system bus 116*b* via a video interface 154*b*, such as a video adapter. The hash cracking service provider server computing system 100*b* can include other output devices, such as speakers, printers, etc.

The hash cracking service provider server computing system 100*b* can operate in a networked environment using logical connections to one or more remote computers and/or devices associated with hash cracking operations. For example, the hash cracking service provider server computing system 100*b* can operate in a networked environment using logical connections to one or more mobile devices, landline telephones and other service providers or information servers associated with the hash cracking operations as described above with reference to FIG. 1B. Communications may be via a wired and/or wireless network architecture, for instance wired and wireless enterprise-wide computer networks, intranets, extranets, telecommunications networks, cellular networks, paging networks, and other mobile networks.

The client computing systems 100*c*, 100*d* (only two shown) may each include one or more processing units 112*c*, 112*d* (two shown for each), a system memory 114*c*, 114*d* and a system bus 116*c*, 116*d* that couples various system components including the system memory 114*c*, 114*d* to the processing units 112*c*, 112*d*. The processing units 112*c*, 112*d* may be any logic processing unit, such as one or more central processing units (CPUs), digital signal processors (DSPs), graphics processing units, application-specific integrated circuits (ASICs), field programmable gate arrays (FPGAs), etc. The system bus 116*c*, 116*d* can employ any known bus structures or architectures, including a memory bus with memory controller, a peripheral bus, and a local bus. The system memory 114*c*, 114*d* includes read-only memory ("ROM") 118*c*, 118*d* and random access memory ("RAM") 120*c*, 120*d*. A basic input/output system ("BIOS") 122*c*, 122*d*, which can form part of the ROM 118*c*, 118*d*, contains basic routines that help transfer information between elements within the client computing systems 100*c*, 100*d*, such as during start-up.

The client computing systems 100*c*, 100*d* may also each include a plurality of interfaces such as network interface 160*c*, 160*d*, interface 150*c*, 150*d*, supporting modem 162*c*, 162*d* or any other wireless/wired interfaces.

The client computing systems 100*c*, 100*d* may each include a hard disk drive 124*c*, 124*d* for reading from and writing to a hard disk 126*c*, 126*d*, an optical disk drive 128*c*, 128*d* for reading from and writing to removable optical disks 132*c*, 132*d*, and/or a magnetic disk drive 130*c*, 130*d* for reading from and writing to magnetic disks 134*c*, 134*d*. The optical disk 132*c*, 132*d* can be a CD-ROM or DVD-ROM, while the magnetic disk 134*c*, 134*d* can be any magnetic storage media. The hard disk drive 124*c*, 124*d*, optical disk drive 128*c*, 128*d* and magnetic disk drive 130*c*, 130*d* may communicate with the processing unit 112*c*, 112*d* via the system bus 116*c*, 116*d*. The hard disk drive 124*c*, 124*d*, optical disk drive 128*c*, 128*d* and magnetic disk drive 130*c*, 130*d* may include interfaces or controllers (not shown) coupled between such drives and the system bus 116*c*, 116*d*, as is known by those skilled in the relevant art. The drives 124*c*, 124*d*, 128*c*, 128*d* and 130*c*, 130*d*, and their associated computer-readable storage media 126*c*, 126*d*, 132*c*, 132*d*, 134*c*, 134*d*, may provide nonvolatile and non-transitory storage of computer readable instructions, data structures, program modules and other data for the client computing systems 100*c*, 100*d*. Although the depicted client computing systems 100*c*, 100*d* are illustrated employing a hard disk or SSD 126*c*, 126*d*, optical disk 132*c*, 132*d* and magnetic disk 130*c*, 130*d*, those skilled in the relevant art will appreciate that other types of computer-readable storage media that can store data accessible by a computer may be employed, such as flash memory, digital video disks ("DVD"), Bernoulli cartridges, RAMs, ROMs, smart cards, various solid state drives, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic storage devices, solid state memory or any other medium which can be used to store the desired information and which may be accessed by processing unit(s) 112*c*, 112*d*.

Program modules can be stored in the system memory 114*c*, 114*d*, such as an operating system 136*c*, 136*d*; one or more application programs 138*c*, 138*d* (e.g., client-side hash cracking application); other programs or modules 140*c*, 140*d*; program data 142*c*, 142*d*; and hashing functions 144*c*, 144*d*. Application programs 138*c*, 138*d* along with the program data 142*c*, 142*d*, and hashing functions 144*c*, 144*d*, may include processor-executable instructions and data that cause the processor(s) 112*c*, 112*d* to execute the various algorithms described herein. The application programs 138*c*, 138*d* (e.g., client-side hash cracking application) can, for example, cause the hashing of a hashed passcode, identification or selection of a portion of the hash of the hashed passcode, generation of an inquiry or request specifying the portion of the hash of the hashed passcode, receipt of a set or bin of clear text passcodes and/or associated metadata, hashing of the clear text passcodes and comparison with a hashed passcode to be cracked to determine whether a match exists and hence the passcode is cracked. Other program modules 140*c*, 140*d* may include instructions for handling security such as password or other access protection and communications encryption in addition to the hashing and hash cracking generally described herein. The system memory 114*c*, 114*d* may also include communications programs, for example, a Web client or browser as part of the application programs 138*c*, 138*d* for permitting the client computing systems 100*c*, 100*d* to access and exchange data with sources such as Web sites of the Internet, corporate intranets, extranets, or other networks and devices as described herein, as well as server applications on other server computing systems.

Figure 1C:
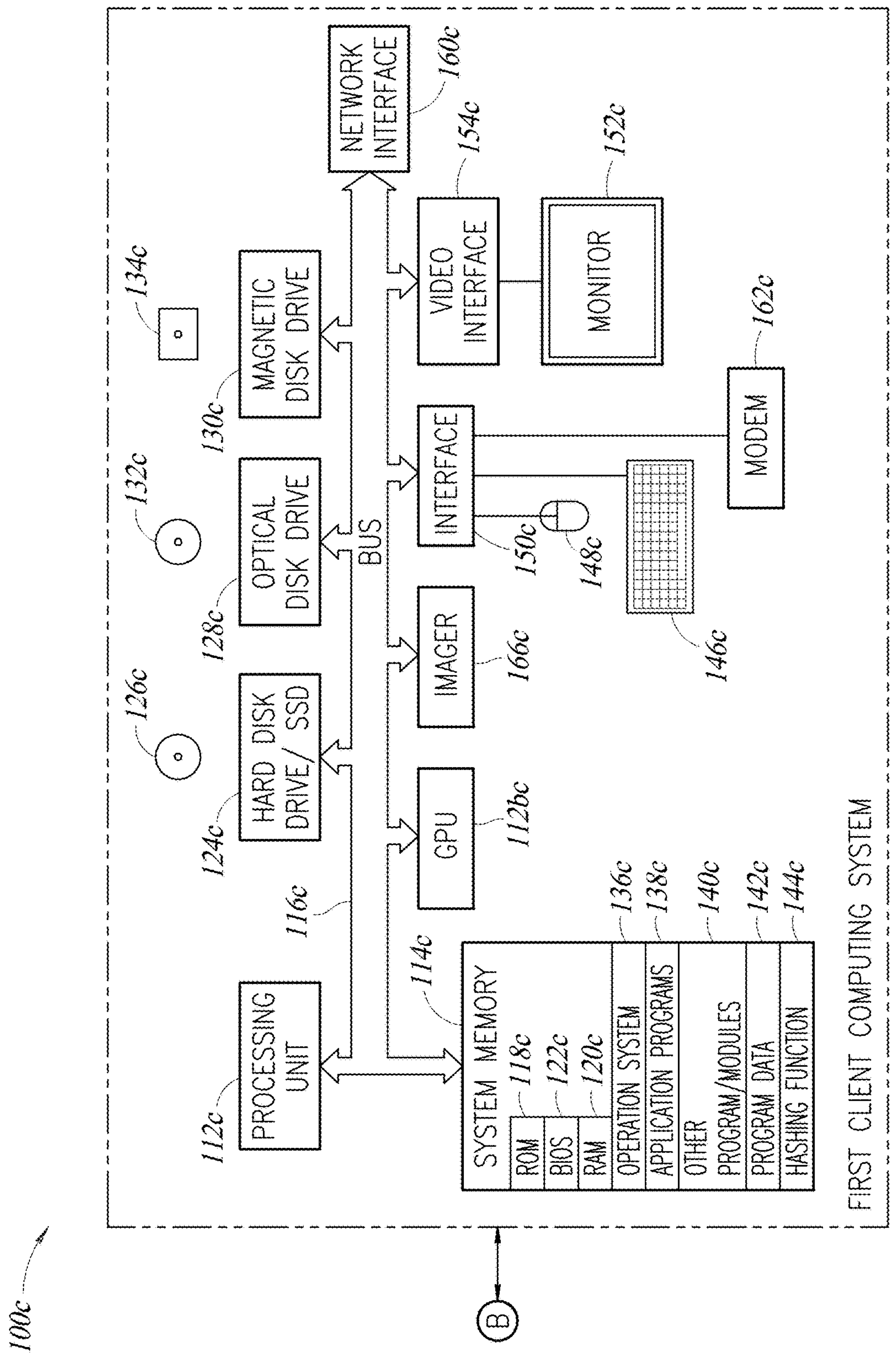
Figure 1D:
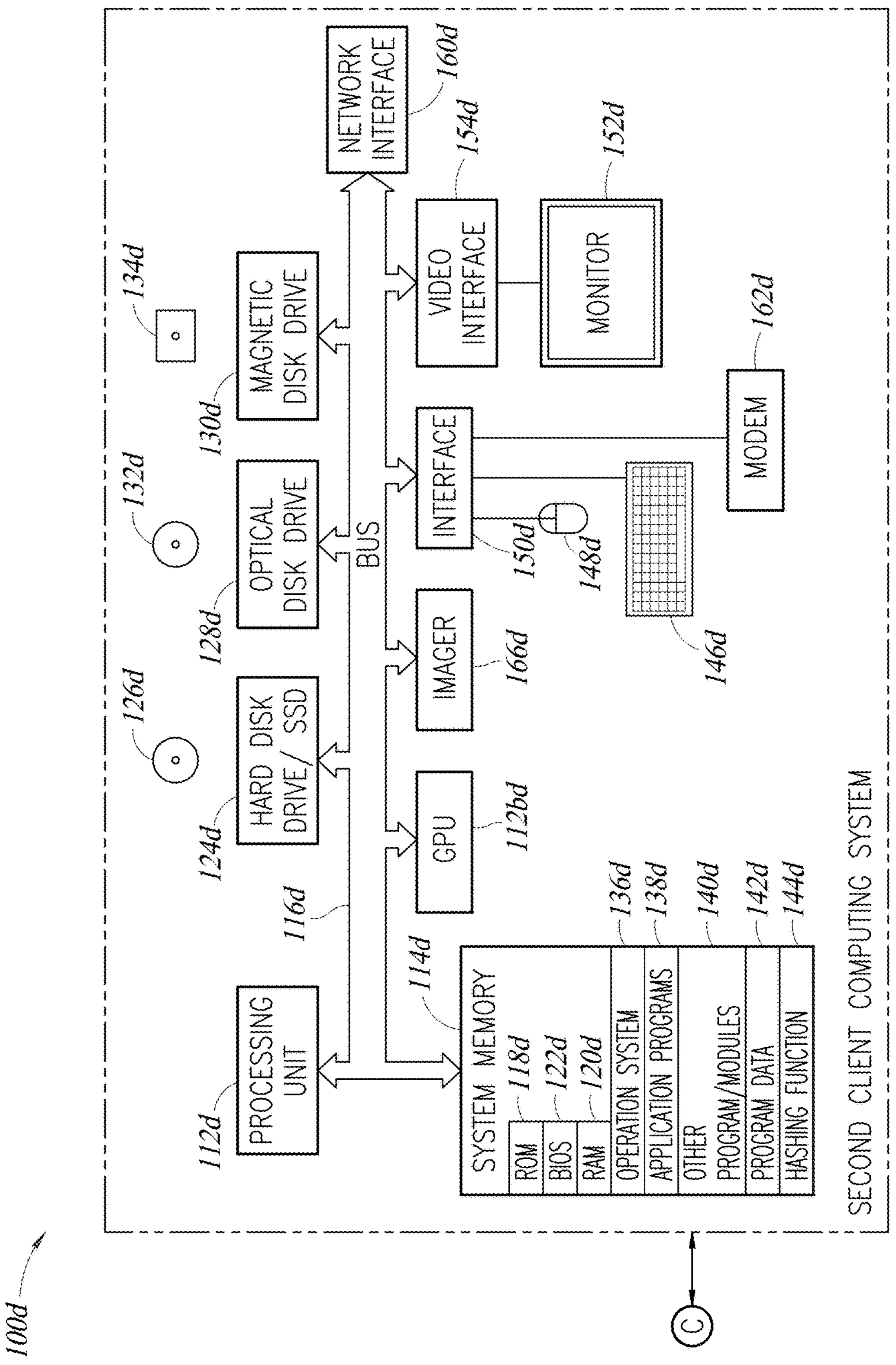

While shown in FIGS. 1C and 1D as being stored in the system memory 114*c*, 114*d*, the operating system 136*c*, 136*d*, application programs 138*c*, 138*d*, other programs/modules 140*c*, 140*d*, program data 142*c*, 142*d*, and hashing functions 144*c*, 144*d* can be stored on the hard disk 126*c*, 126*d* of the hard disk drive 124*c*, 124*d*, the optical disk 132*c*, 132*d* of the optical disk drive 128*c*, 128*d* and/or the magnetic disk 134*c*, 134*d* of the magnetic disk drive 130*c*, 130*d*, or other memory storage devices, such as solid state drives. In at least some implementations, the hashing functions 144*c*, 144*d* can be implemented in a standalone or a dedicated device (e.g., dedicated processor) that accepts input and generates output without providing access to any hashing algorithms, in order to ensure security of the hashing functions.

An operator, such as a user, can enter commands and information into the client computing systems 100*c*, 100*d* through input devices such as a touch screen or keyboard 146*c*, 146*d*, an imager 166*c*, 166*d*, a pointing device such as a mouse 148*c*, 148*d*, and/or via a graphical user interface. Other input devices can include a touchpad, microphone, joystick, game pad, tablet, scanner, etc. These and other input devices are connected to one or more of the processing units 112*c*, 112*d* through an interface 150*c*, 150*d* such as a serial port interface that couples to the system bus 116*c*, 116*d*, although other interfaces such as a parallel port, a game port or a wireless interface or a universal serial bus ("USB") can be used. A monitor 152*c*, 152*d* or other display device is coupled to the system bus 116*c*, 116*d* via a video interface 154*c*, 154*d*, such as a video adapter. The client computing systems 100*c*, 100*d* can include other output devices, such as speakers, printers, etc.

The client computing systems 100*c*, 100*d* can operate in a networked environment using logical connections to one or more remote computers and/or devices associated with hash cracking operations. For example, the client computing systems 100*c*, 100*d* can operate in a networked environment using logical connections to one or more mobile devices, landline telephones and other service providers or information servers associated with the hash cracking operations as described above with reference to FIGS. 1C and 1D. Communications may be via a wired and/or wireless network architecture, for instance wired and wireless enterprise-wide computer networks, intranets, extranets, telecommunications networks, cellular networks, paging networks, and other mobile networks.

Figure 2A:
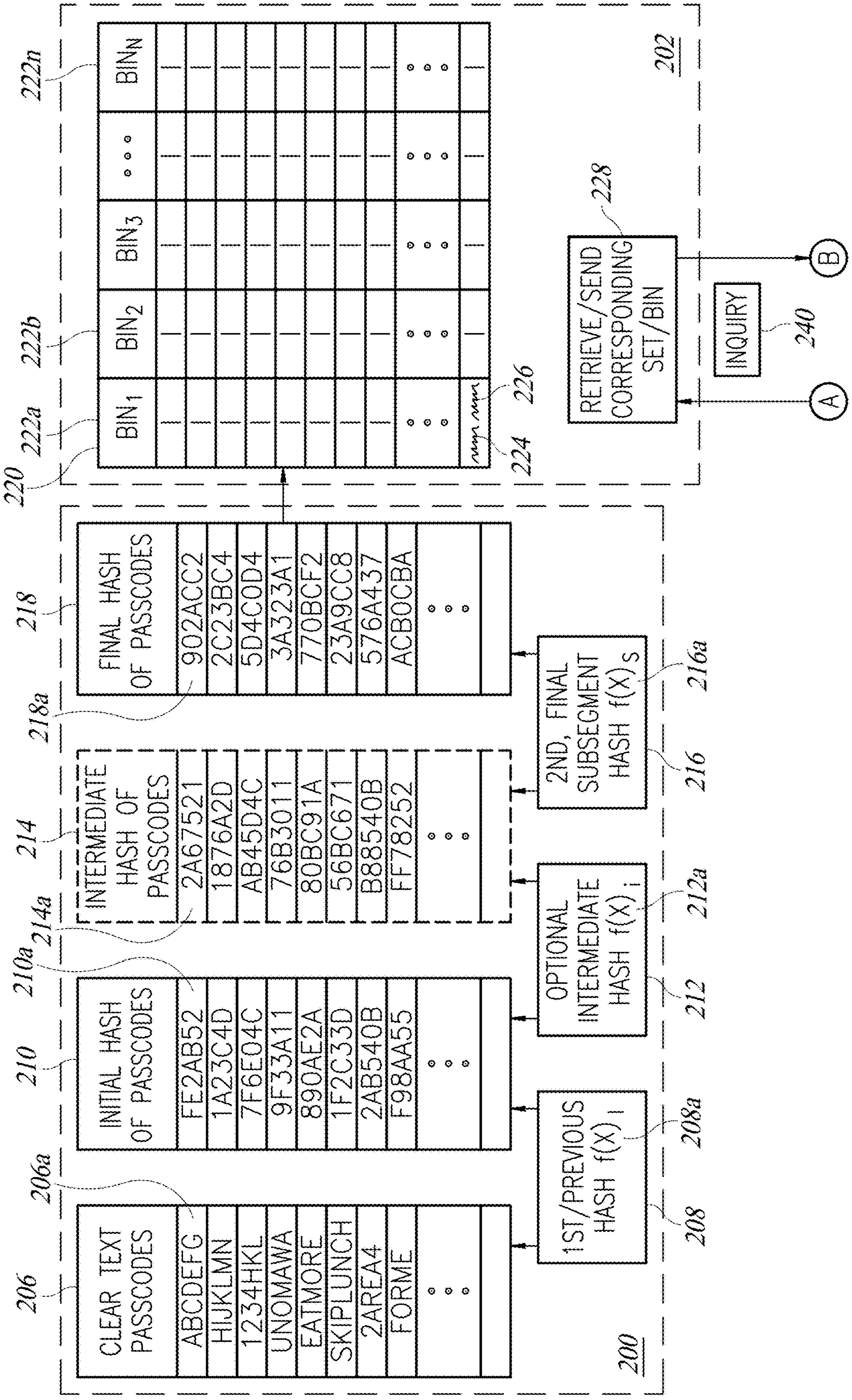
FIGS. 2A and 2B is a schematic diagram of operation of an example interaction of a hash cracking service provider back end computing system with a hash cracking service provider server computing system, which in turn interacts with a client computing system, to perform hash cracking in a privacy preserving manner, according to one illustrated embodiment.
Figure 2B:
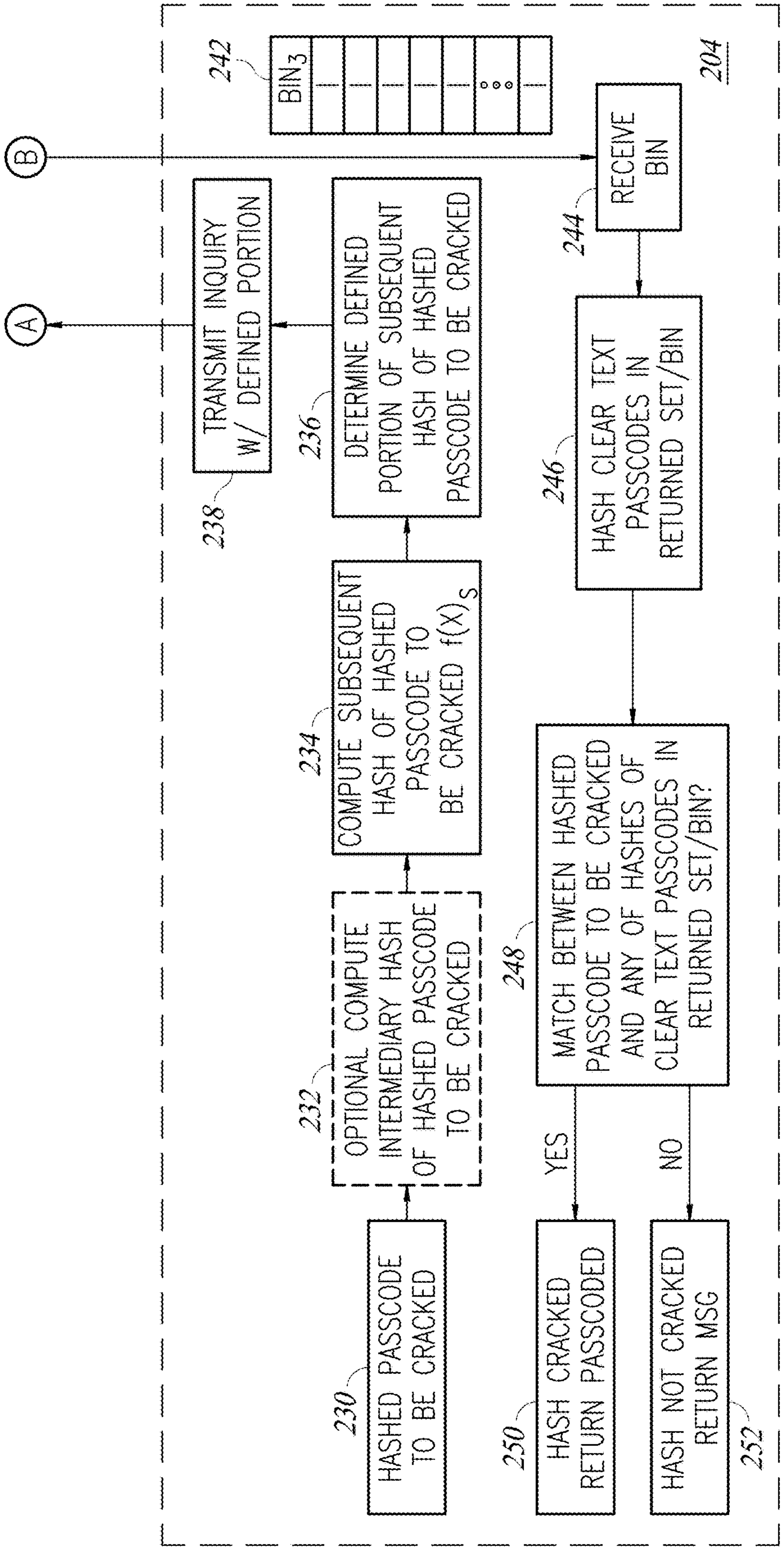

FIGS. 2A and 2B are a schematic diagram of operation of an example interaction of a hash cracking service provider back end computing system 200 with a hash cracking service provider server computing system 202, which in turn interacts with a client computing system 204, to perform hash cracking in a privacy preserving manner, according to one illustrated embodiment.

The hash cracking service provider back end computing system 200 can take the form of the hash cracking service provider back end computing system 100*a* (FIG. 1A), the hash cracking service provider server computing system 202 can take the form of the hash cracking service provider server computing system 100*b* (FIG. 1B), and the client computing system 204 can take the form of either the first or second client computing systems 100*c*, 100*d* (FIGS. 1C, 1D). The client computing system 204 is communicatively coupled to the hash cracking service provider server computing system 202, for example via conventional network architecture. The hash cracking service provider back end computing system 200 can be communicatively coupled to the hash cracking service provider server computing system 202, or alternatively output of the hash cracking service provider back end computing system 200 can be shared (e.g., nontransitory storage media share aka "sneaker net") with the hash cracking service provider server computing system 202.

The hash cracking service provider back end computing system 200 includes one or more nontransitory processor-readable media, which can for example store a set of clear text passcodes (aka "wordlist) 206 with one clear text passcode 206*a* called out. The hash cracking service provider back end computing system 200 includes one or more processors, which performs a hash 208 via an initial or first hash function f(x)1 208*a* on each of the clear text passcodes 206*a* of the set of clear text passcodes 206, resulting in a set of initial hash of passcodes 210 stored via one or more nontransitory processor-readable media, with one initial hash of a passcode 210*a* called out.

The one or more processors of hash cracking service provider back end computing system 200 can optionally perform one or more rounds or stages of intermediary hashing 212 (only one round or stage illustrated) via one or more intermediary hash functions f(x)i 212*a* applied on each of the hashed passcodes of the set of initial hash of passcodes. The results of the optional intermediate hash generation can be stored via one or more nontransitory processor-readable media as intermediate hash of passcodes 214 with one intermediate hash of a passcode 214*a* called out.

The one or more processors of hash cracking service provider back end computing system 200 can perform a subsequent or final hashing 216 via a subsequent of final hash function f(x)s 216*a* applied on each of the hashed passcodes of a previous set (e.g., the set of initial hash of passcodes, the set of intermediate hashes of passcodes). The results of the subsequent or final hash generation can be stored via one or more nontransitory processor-readable media as a set of subsequent or final hash of passcodes 218, with one subsequent or final hash of a passcode 218*a* called out.

The hash cracking service provider server computing system 202 includes one or more processors that segregates or bins the clear text passcodes into a data structure 220 comprising a plurality of sets or bins 222*a*, 222*b*-222*n* (only three called out) based on a defined portion of a respective hashed passcode of the subsequent or final set of hashed passcodes 218. The data structures and data of the sets or bins 222*a*, 222*b*-222*n* are stored on or by one or more nontransitory processor-readable media. The sets or bins 222*a*, 222*b*-222*n* can include corresponding clear text passcodes 224 (grouped by set or bin 222*a*, 222*b*-222*n*), and optionally include respective meta data 226 for each of the clear text passcodes 224. For example, the service provider backend computing system 202 segregates or bins the clear text passcode into one of a plurality of bins 222*a*, 222*b*-222*n* based on a prefix portion of the respective hashed passcode of the subsequent or final set of hashed passcodes 218. For instance, the service provider backend computing system 202 can segregate or bin the clear text passcode into one of a plurality of bins 222*a*, 222*b*-222*n* based on a prefix portion that is comprised of a first defined number of a plurality of places of a representation (e.g., hexadecimal representation) of the respective hash of the hashed passcode (e.g., the subsequent or final set of hashed passcodes 218). One illustrative example is implemented as cracking an NTLM hash, using a SHA256 hash to compute a prefix which is used for binning and retrieval, the prefix for example comprising 5 character hexadecimal prefix (e.g., first 5 hexadecimal characters). Various implementations are not limited to the specific hashing functions used as examples and are not limited to the specific prefix used as an example. Thus, other hashing functions can be employed, and other sets of defined strings of characters used to bin the clear text passcodes. Moreover the hash which is used for the binning (e.g., in the example the SHA256 hash from which the prefix is drawn) is not limited to application of a single hash, but could operate with multiple levels or rounds of hashing, for example performing a SHA256 hash of a SHA256 has of a SHA256 hash, etc.

As illustrated in FIGS. 2A and 2B, the service provider backend computing system 202 is communicatively coupled to receive inquiries or requests 240 that specify a portion of a hash of a hashed passcode, and to retrieve and return 228 a set or bin 242 of clear text passcodes and/or associated metadata where the retrieved and returned set or bin 242 corresponds to the identified portion of the hash of a hashed passcode specified in the inquiry or request 240.

The client computing system 204 includes one or more nontransitory processor-readable media, which can for example store one or more hashed passcode to be cracked 230.

The client computing system 204 includes one or more processors, which optionally generate or compute 232 one or more intermediary hashes of the hashed passcode, for example via one or more intermediary hash functions, as described elsewhere herein.

The client computing system 204 includes one or more processors, which generates or computes 234 a subsequent or final hash of the previous hashed passcode (e.g., hashed passcode to be cracked; intermediary hash of hashed passcode to be cracked), for example via a subsequent or final hash function f(x)s, as described elsewhere herein.

The client computing system 204 includes one or more processors which determine or otherwise identify 236 a defined portion of the hash of the hashed passcode to be cracked. The defined portion can comprise a string of characters, for example a defined number of characters in the string at a defined location of the hash of the hashed passcode to be cracked. In at one example, the defined portion take the form a prefix in a representation (e.g., hexadecimal, binary) of the hash of the hashed passcode to be cracked. For instance, defined portion can constitute the first 5 characters of a hexadecimal representation of the hash of the hashed passcode to be cracked.

The client computing system 204 includes one or more processors which transmits 238 an inquiry or request that specifies the identified defined portion of the hash of the hashed passcode to be cracked. The inquiry or request can be transmitted via conventional network architecture, for example as a GET command via an hypertext transfer protocol (HTTP).

The client computing system 204 includes one or more processors which receive 244 a set or bin 242 of clear text passcodes and optionally associated metadata in response to the query or request. The received set or bin 242 includes the clear text passcodes that have in common a portion (e.g., prefix) of a hash of a hash of the clear text passcode. That is, the representations of the hash of the hashed passcode share a string of characters (e.g., share a first defined number of two or more characters of their representations, for instance a hexadecimal or binary representation.)

The client computing system 204 includes one or more processors which generates or computes 246 a hash of one or more of the clear text passcodes of the returned or received set or bin of clear text passcodes and optionally associated metadata in response to the query or request.

The client computing system 204 includes one or more processors which determines whether there is a match 248 between the hashed passcode to be cracked and any of the hashes of the clear text passcodes in the received set of clear text passcodes.

The client computing system 204 includes one or more processors which determines that the hashed passcode to be the cracked has successfully been cracked 250 if a match is found. Otherwise the one or more processors which determines that the hashed passcode to be the cracked has not been cracked 252 if a match is not found.

Figure 3:
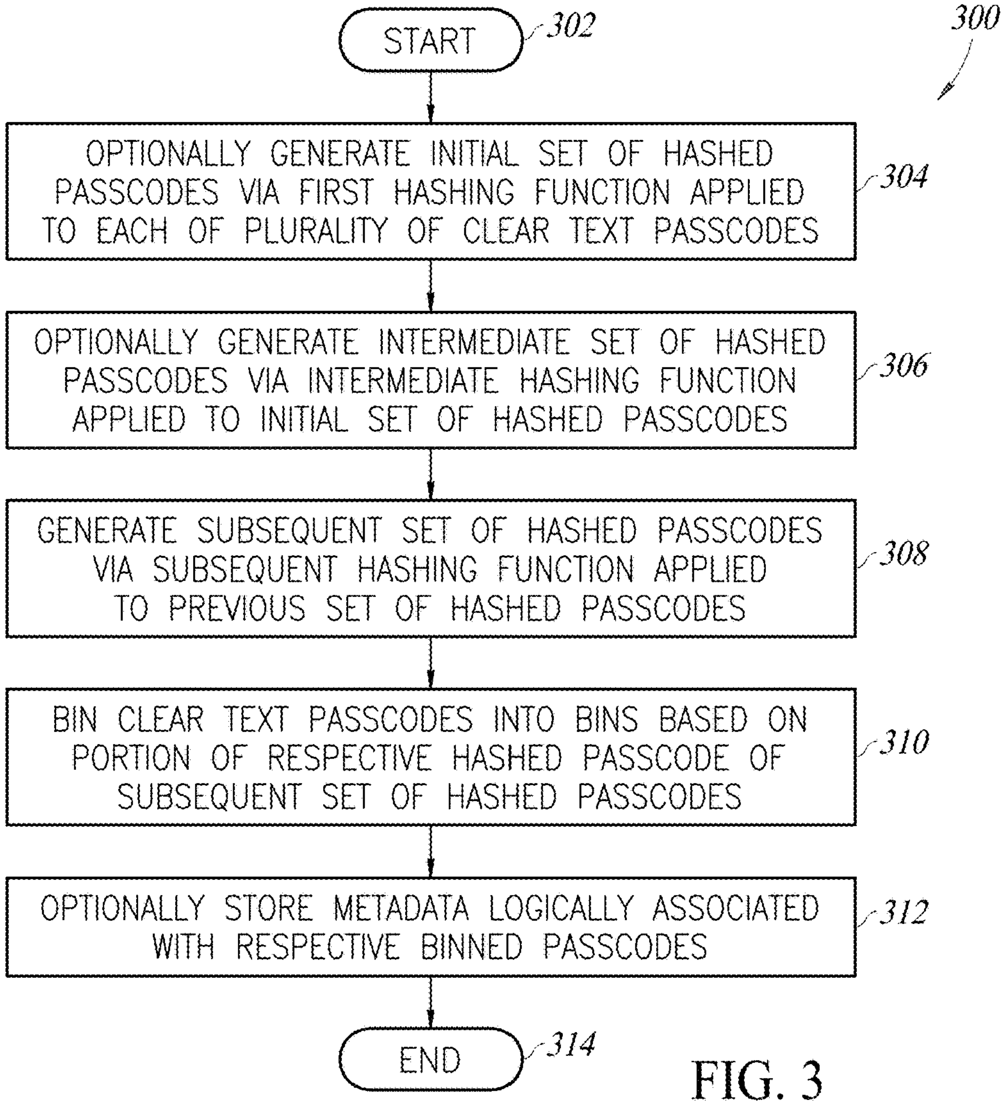
FIG. 3 is a flow diagram showing a method of operation of a service provider back end computing system to hash and bin hashed passcodes as part of providing a hash cracking service, according to one illustrated embodiment.

FIG. 3 shows a method 300 of operation of a service provider back end computing system to hash and bin hashed passcodes as part of providing a hash cracking service, according to one illustrated embodiment.

As described herein, a service provider of hash cracking services can implement a backend computing system that generates hashes of hashed passcodes and segregates or bins clear text passcodes based on a portion of the hashes of hashed passcodes, and a server computing system that services requests for hash cracking services employing the results (e.g., sets or bins of binned clear text passcodes and/or associated metadata) of the service provider backend computing system. While these operations are illustrated as split between two computing systems (i.e., hash cracking service provider backend computing system, hash cracking service provider server computing system), in some implementations the operations can be implemented by the same computing system rather than being separated between two different computing systems dedicated respectively to generation of binned passcodes and servicing of requests.

The method 300 starts at 302, for example in response to powering ON of the processor-based system, receipt of a command, or invocation from a calling routine.

Optionally at 304, a service provider backend computing system generates initial set of hashed passcodes via an initial or first hashing function applied to each of a plurality of clear text passcodes in a set (e.g. "wordlist") of clear text passcodes. For example, the backend computing system can apply an initial or first hash function to each clear text passcode in a set of clear text passcodes. The set of clear text passcodes can be accumulated or otherwise generated from one or more of a variety of sources of clear text passcodes, including but not limited to publically and/or privately available lists of clear text passcodes. Alternatively, the backend computing system can obtain a previously hashed set of passcodes, along with their associated clear text passcodes, the where previously hashed set of passcodes were hashed by one or more other computing systems. The backend computing system can obtain previously hashed set of passcodes from one or more of a variety of sources of hashed passcodes, including but not limited to publically and/or privately available lists of hashed passcodes.

Optionally at 306, the service provider backend computing system generates an intermediate set of hashed passcodes. For example, the backend computing system can apply an intermediate hashing function to the hashed passcodes of the initial set of hashed passcodes. In some implementations, the optional intermediate hashing function can be a same type of hash function (e.g., an NTLM hash) as the first hashing function (e.g., an NTLM hash). In some implementations, the optional intermediate hashing function (e.g., an SHA256 hash) can be a different type of hash function than the first hashing function (an NTLM hash). It is noted that the service provider backend computing system can optionally implement none, one, two or even more intermediate hashes of any given passcode, subsequently applying a hash function to the results of each previous intermediate hash. In some implementations, one or more of the optional intermediate hashing functions can be a same type of hash function as the other ones of the intermediate hashing functions. In some implementations, one or more of the optional intermediate hashing functions can be a different type of hash function from the other ones of the intermediate hashing functions.

At 308, the service provider backend computing system generates a subsequent set of hashed passcodes. For example, the backend computing system can apply a subsequent hashing function to previous set of hashed passcodes (e.g., applied to the hashed passcodes of the initial set of hashed passcodes; applied to the hashed passcodes of the intermediate set of hashed passcodes). In some implementations, the subsequent hashing function can be a same type of hash function (e.g., an NTLM hash) as the first hashing function (e.g., an NTLM hash). In some implementations, the subsequent hashing function can be a different type of hash function (e.g., an SHA256 hash) than the previous hashing function (an NTLM hash).

At 310, the service provider backend computing system segregates, separates or otherwise bins the clear text passcodes into a plurality of sets or bins based on a defined portion of a respective hashed passcode of the subsequent set of hashed passcodes. For example, the service provider backend computing system segregates, separates or otherwise bins the clear text passcode into one of a plurality of sets or bins based on a prefix portion of the respective hashed passcode of the subsequent set of hashed passcodes. For instance, the service provider backend computing system can segregate, separate or otherwise bin the clear text passcode into one of a plurality of sets or bins based on a prefix portion that is comprised of a first defined number of a plurality of places of a representation (e.g., hexadecimal representation) of the respective hashed passcode of the subsequent set of hashed passcodes. One illustrative example is implemented as cracking an NTLM hash, using a SHA256 hash to computing a prefix which is used for binning and retrieval, the prefix for example comprising a 5 character hexadecimal prefix (e.g., first 5 hexadecimal characters of the hash of the hashed passcode). Various implementations are not limited to the specific hashing functions used as illustrative examples and are not limited to use of the specific portion (i.e., prefix) used as an illustrated example. Thus, other hashing functions can be employed, and other sets of defined strings of characters used to bin the clear text passcodes. Moreover the hash which is used for the binning (e.g., in the example the SHA256 hash from which the prefix is drawn) is not limited to application of a single hash, but could operate with multiple levels of hashing, for example performing a SHA256 hash of a SHA256 has of a SHA256 hash, etc.

Optionally at 312, the service provider backend computing system stores metadata logically associated with each clear text passcode in each set of bin. For instance, the first, initial or previous hash (e.g., NTLM hash) of the passcode of each potential clear text passcode can be stored alongside or otherwise logically associated with (e.g., via a pointer, linked list, respective fields of a record data structure) the respective clear text passcode. Such can allow each bin provided by the server computing system to the client computing system to include clear text passcodes and metadata (e.g., first or initial hashes of clear text passcodes, also referred to as hashed passcodes). Such metadata can advantageously allow the client computing system to avoid re-computing the first, initial or previous hashes (e.g., NTLM hash) of the clear text passcodes returned (e.g., returned set or bin of clear text passcodes). Thus, the client computing system could simply compare the returned first, initial or previous hashes (e.g., NTLM hashes) with the hashed passcode (e.g., NTLM hashed passcode) to be cracked.

Thus, the service provider backend computing system generates and/or maintains a data store that stores clear text passcodes and/or associated metadata segregated, separated or otherwise binned based on a portion of a hash of a hashed passcode. The data of the data store is made accessible or provided to the service provider server computing system.

The method 300 terminates or ends at 314, for example until invoked again. In some implementations, the method 300 may repeat continually or periodically.

Figure 4:
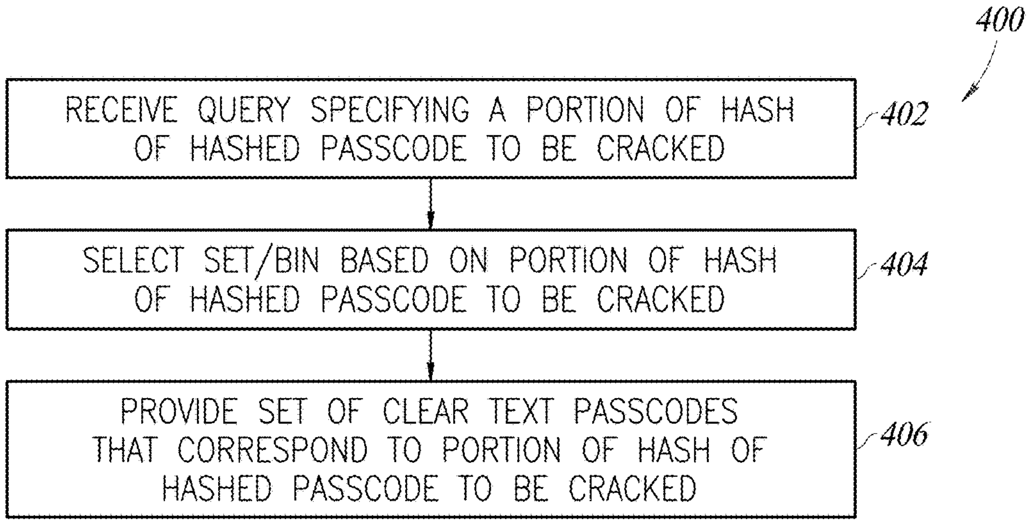
FIG. 4 is a flow diagram showing a method of operation of a server computing system to receive and service hash and service cracking queries from client computing systems, according to one illustrated embodiment.

FIG. 4 shows a method 400 of operation of a server computing system to receive and service hash cracking queries or requests from one or more client computing systems, according to one illustrated embodiment.

As noted above, the service provider server computing system has access to the data of the data store generated and/or maintained by the service provider backend computing system.

At 402, a service provider server computing system receives one or more queries or requests, each query or request specifying a portion of a hash of a hashed passcode to be cracked. For example, the query can specify a defined portion of a subsequent hash of a previous hash of a clear text passcode, the previous hash of the clear text passcode which is to be cracked. The subsequent hashing helps preserve privacy and security, as does transmission of only a portion of the subsequently hashed passcode, which has effectively applied at least a second hash function on the results of a first hash function.

At 404, the service provider server computing system selects or otherwise identifies or retrieves a set or bin of clear text passcodes that correspond to the portion of the hash or the hashed passcode to be cracked identified in the received query.

At 406, the service provider server computing system provides the set or bin of clear text passcodes that corresponds to the portion of the hash of the hashed passcode to be cracked. For example, the service provider server computing system can transmit the set or bin of clear text passcodes to the client computing system. In some implementations, the service provider server computing system can transmit the set or bin of clear text passcodes along with associated metadata. For instance, the service provider server computing system can transmit the set or bin of clear text passcodes along with hashed versions of each of the clear text passcodes logically associated with respective ones of the clear text passcodes.

Figure 5:
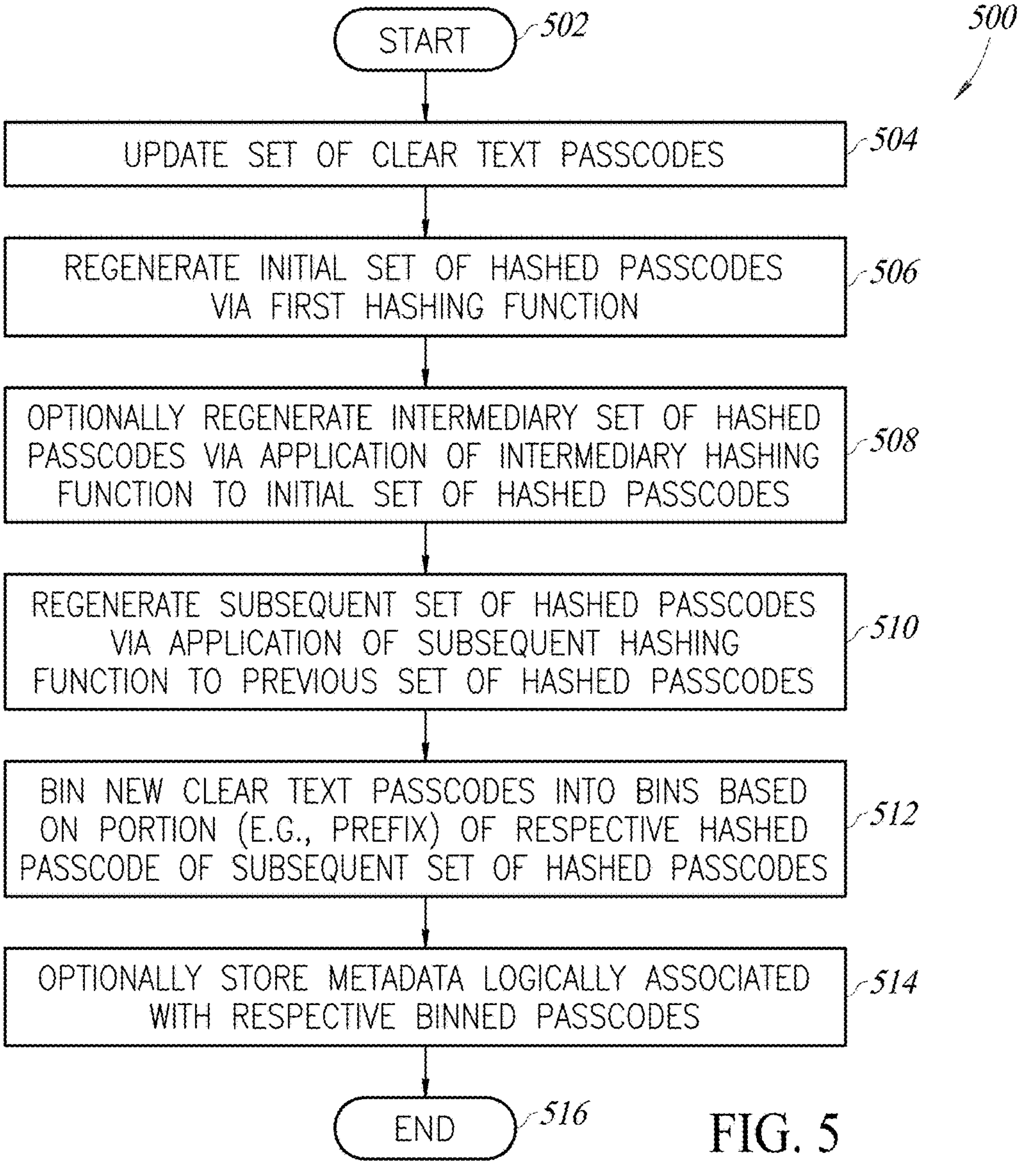
FIG. 5 is a flow diagram showing a method of operation of a service provider back end computing system to update sets of passcode hashes and binning, for instance in an ongoing basis, according to one illustrated embodiment.

FIG. 5 shows a method 500 of operation of a service provider back end computing system to update sets of passcode hashes and binning, for instance in an ongoing basis, according to one illustrated embodiment.

It can be desirable to maintain an updated set of clear text passwords, for instance allowing a set of clear text passcodes or wordlist to grow over time. The method 500 can be executed periodically or continually or even continuously to update the sets or bins of clear text passcodes and optionally the metadata maintained by the service provider. The method 500 can, for example, be executed after execution of the method 300 (FIG. 3). The method 500 can, for example, optionally be executed after execution of the method 400 (FIG. 4).

The method 500 starts at 502, for example in response to powering ON of the processor-based system, receipt of a command, or invocation from a calling routine.

Optionally at 504, a service provider backend computing system updates an existing set or wordlist of clear text passcodes. The updated set of clear text passcodes can be accumulated or otherwise generated from one or more of a variety of sources of clear text passcodes, including but not limited to publically and/or privately available lists of clear text passcodes.

At 506, the service provider backend computing system regenerates the initial set of hashed passcodes via first hashing function. For example, the service provider backend computing system can apply an initial or first hashing function to each of the plurality of clear text passcodes in an updated set (e.g. updated "wordlist") of clear text passcodes, or to any new clear text passcodes that have been added to a previous set (previous "wordlist") of clear text passcodes for which hashes were previously generated. For example, the backend computing system can apply the initial or first hash function (e.g., an NTLM hash) to each newly added clear text passcode in the updated set of clear text passcodes.

Optionally at 508, the service provider backend computing system optionally regenerates one or more intermediary sets of hashed passcodes via application of one or more intermediary hashing functions to updated set of hashed passcodes. As previously noted, any of none, one, two or more intermediate hashes can be implemented by subsequently applying a hash function to the results of each previous intermediate hash.

At 510, the service provider backend computing system regenerates the subsequent set of hashed passcodes via application of a subsequent hashing function to each of the hashed passcodes of a previous set of hashed passcodes. For example, the backend computing system can apply a subsequent hashing function to a previous set of hashed passcodes (e.g., applied to the hashed passcodes of the initial or first set of hashed passcodes; applied to the hashed passcodes of the intermediate set of hashed passcodes). In some implementations, the subsequent hashing function can be a same type of hash function (e.g., an NTLM hash) as the first hashing function (e.g., an NTLM hash). In some implementations, the subsequent hashing function can be a different type of hash function (e.g., an SHA256 hash) than the previous hashing function (an NTLM hash).

At 512, the service provider backend computing system segregates, separates or otherwise bins new or added clear text passcodes into sets or bins of a plurality of sets or bins, based on a defined portion of a respective hash of the hashed passcodes comprising the subsequent or final set of hashed passcodes. For example, the service provider backend computing system segregates, separates or otherwise bins each of the new or added clear text passcodes into one of a plurality of bins based on a defined portion (e.g., prefix portion) of the respective hash of the hashed passcode of the subsequent set of hashed passcodes. In this respect, subsequent refers to the fact that a subsequent hash was applied to a previously hashed passcode.

Optionally at 514, the service provider backend computing system stores metadata logically associated with respective binned passcodes For instance, the first, initial or previous hash (e.g., NTLM hash) of the passcode of each new or added clear text passcode can be stored alongside or otherwise logically associated with (e.g., via a pointer, linked list, respective fields of a record data structure) the respective new or added clear text passcode. Such can allow each bin provided by the server computing system to the client computing system to include clear text passcodes and metadata (e.g., first or initial hashes of clear text passcodes, also referred to as hashed passcodes). Such can advantageously allow the client computing system to avoid recomputing the first, initial or previous hashes (e.g., NTLM hash) of the clear text passcodes returned (e.g., returned bin of clear text passcodes).

Thus, the service provider backend computing system updates and/or maintains a data store that stores clear text passcodes and/or associated metadata segregated, separated or otherwise binned based on a portion of a hash of a hashed passcode. The data of the data store is made accessible or provided to the service provider server computing system.

The method 500 terminates or ends at 516, for example until invoked again. In some implementations, the method 500 may repeat continually or periodically.

Figure 6:
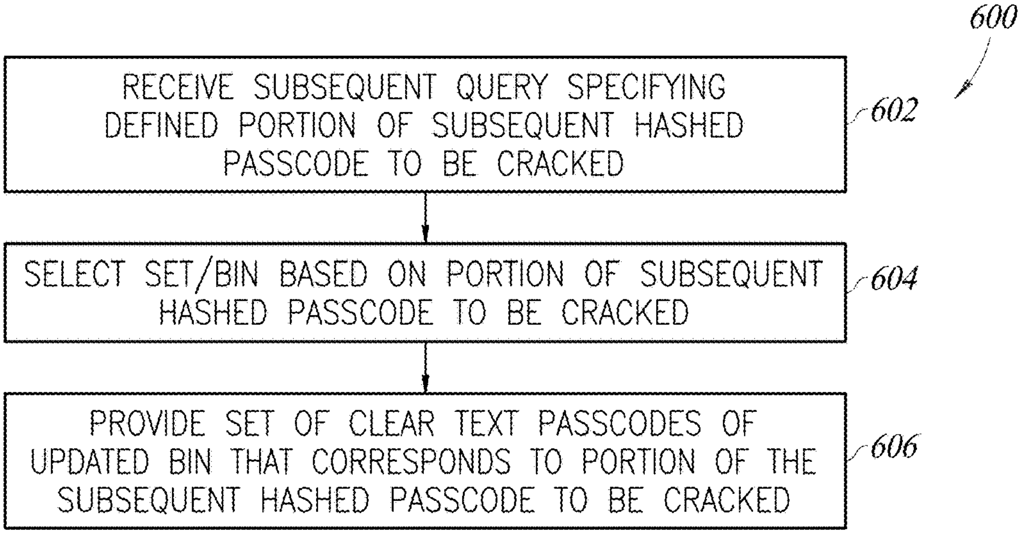
FIG. 6 is a flow diagram showing a method of operation of a server computing system to receive and service hash and service cracking queries from client computing systems using updated sets of passcode hashes, according to one illustrated embodiment.

FIG. 6 show a method 600 of operation of a server computing system to receive and service hash and service cracking queries from client computing systems using updated sets of passcode hashes, according to one illustrated embodiment.

The method 600 can, for example, be executed after execution of the method 500 (FIG. 5) in which the set or wordlist of clear text passcodes has been updated. As noted above, the service provider server computing system has access to the data of the data store generated and/or maintained by the service provider backend computing system.

At 602, a service provider server computing system receives one or more subsequent queries or requests (a query or request received after an update to the sets of passcode hashes and binning by the service provider back end computing system and typically following a previous query or request), each subsequent query or request specifies a portion of a subsequent hashed passcode to be cracked (subsequent relative to a previous hashed passcode to be cracked). For example, the subsequent query or request can specify a defined portion of a subsequent hash of a previous hash of a clear text passcode, the previous hash of the clear text passcode which is to be cracked. The subsequent hashing helps preserve privacy and security, as does transmission of only a portion of the subsequently hashed passcode, which has effectively applied at least a second hash function on the results of a first hash function.

At 606, the service provider server computing system selects or otherwise identifies or retrieves a set or bin of clear text passcodes that correspond to the portion of the subsequent hashed passcode to be cracked identified in the received query or request.

At 606, the service provider server computing system provides the set of clear text passcodes of updated set or bin of clear text passcodes that corresponds to the portion of the subsequent hashed passcode to be cracked. For example, the service provider server computing system can transmit the set or bin of clear text passcodes to the client computing system. In some implementations, the service provider server computing system can transmit the set or bin of clear text passcodes along with associated metadata. For instance, the service provider server computing system can transmit the set or bin of clear text passcodes along with hashed versions of each of the clear text passcodes logically associated with respective ones of the clear text passcodes.

Figure 7:
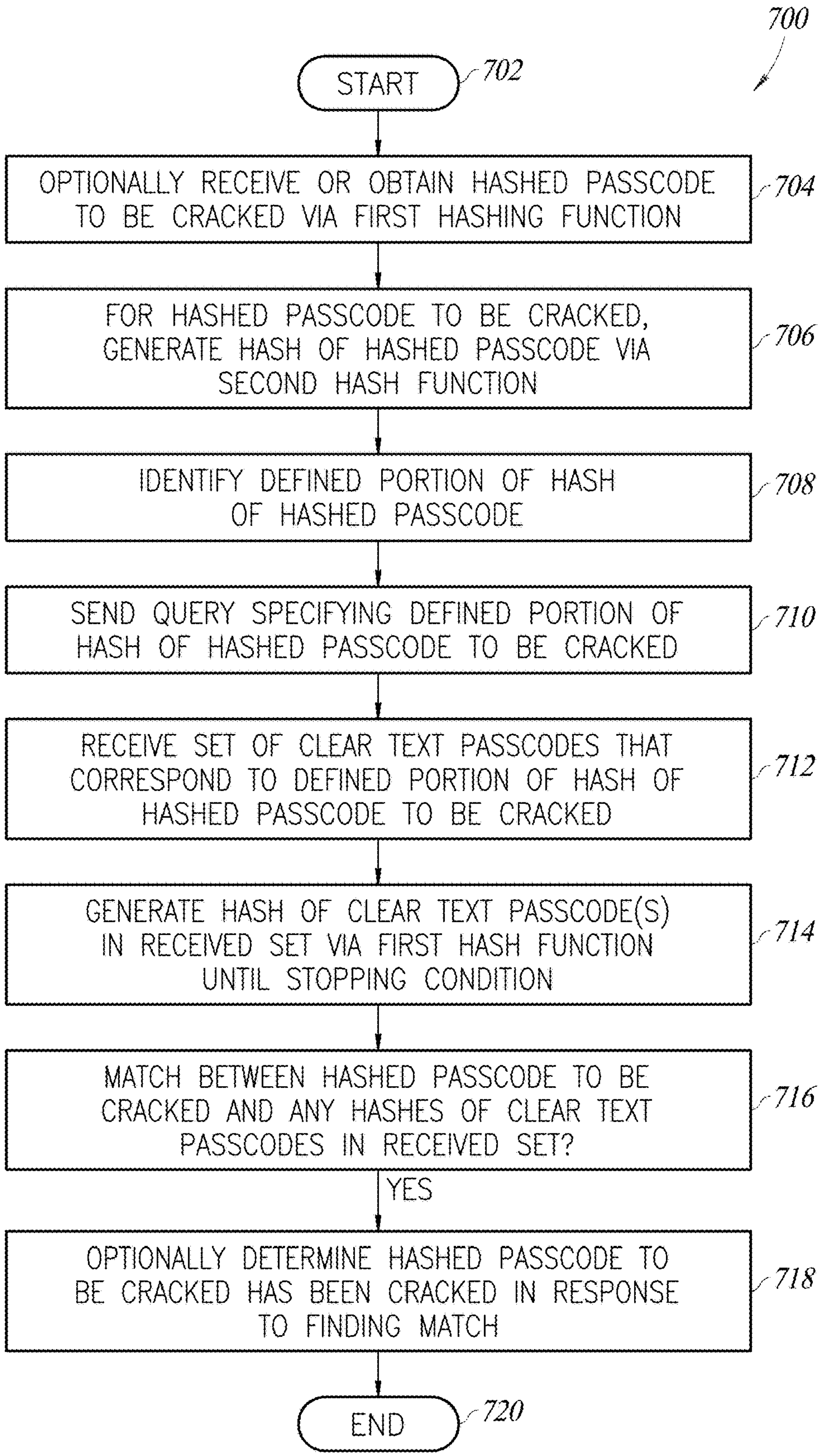
FIG. 7 is a flow diagram showing a method of operation of a client computing system to crack hashes using the services of a hash cracking service provider, according to one illustrated embodiment.

FIG. 7 shows a method 700 of operation of a client computing system to crack hashes using the services of a hash cracking service provider, according to one illustrated embodiment.

The method 700 starts at 702, for example in response to powering ON of the processor-based system, receipt of a command, or invocation from a calling routine.

Optionally at 704, a client computing system receives or obtains a hashed passcode to be cracked, the passcode hashed via first or initial hashing function (e.g., an NTLM hash). For example, the hashed passcode to be cracked can be provided to a local client (e.g., a web browser running JavaScript and executing on a client computing system that is local to the user).

At 706, for a hashed passcode to be cracked, the client computing system generates a hash of the hashed passcode. For example, where the hashed passcode to be cracked was hashed with a first hash function, the client computing system can generate a hash of the hashed passcode via a second hash function. In some implementations, the second hashing function can be a same type of hash function (e.g., an NTLM hash) as the first hashing function (e.g., an NTLM hash). In some implementations, the second hashing function (e.g., an SHA256 hash) can be a different type of hash function than the first hashing function (an NTLM hash). In some implementations, one or more intermediary hashes can be implemented via intermediary hash functions.

At 708, the client computing system identifies a defined portion of the hash of the hashed passcode to be cracked. The defined portion can comprise a string of characters, for example a defined number of characters in the string at a defined location of the hash of the hashed passcode to be cracked. In at one example, the defined portion take the form a prefix in a representation (e.g., hexadecimal, binary) of the hash of the hashed passcode to be cracked. For instance, defined portion can constitute the first 5 characters of a hexadecimal representation of the hash of the hashed passcode to be cracked.

At 710, the client computing system sends a query or request that specifies a defined portion of the hash of the hashed passcode to be cracked. The query or request can take the form of a request to a sever (e.g., Web server) sent via a conventional network architecture, for example an hypertext transport protocol (HTTP; HTTPS) request that specifies the defined portion (e.g., prefix) of the hash of the hashed passcode to be cracked.

At 712, the client computing system receives a set or bin of clear text passcodes that correspond to the defined portion of the hash of the hashed passcode to be cracked. The received set or bin can optionally include metadata for each of the clear text passcodes, for example a hashed version of each clear text passcode, the metadata logically associated with the respective clear text passcode. The client computing system can, for example, receive the set or bin of clear text passcodes via a conventional network architecture.

At 714, the client computing system generates hash of one, more or all of the clear text passcodes in the received set of clear text passcodes. For example, the client computing system can apply an initial or first hash function to each clear text passcode in the received set or bin of clear text passcodes. In some implementations, the client computing system generates the hash for all of the clear text passcodes in the received set of clear text passcodes before passing to the next operation or act 716 of method 700. In other implementations, the client computing system generates iterates through each of the clear text passcodes in the received set of clear text passcodes, first generating the hash and then determining whether a match exists at 716, before returning to act 714 and repeating until a stopping condition is reached. The stopping conditions can include finding a match in operation or act 716, and/or processing all of the clear text passcodes in the received set of clear text passcodes without finding a match in operation or act 716. As explained herein, some implementations can include metadata in the received set of clear text passcodes, and the metadata can, for example include the hashed version of each of the clear text passcode in the received set of clear text passcodes. Such implementations can allow the omission of generating a hash of one, more or all of the clear text passcodes in the received set of clear text passcodes 714.

At 716, the client computing system determines whether there is a match between the hashed passcode to be cracked and any of the hashes of the clear text passcodes in the received set of clear text passcodes. As noted above, the determination of whether a match exists can be performed iteratively with the generation of the hash of the clear text passcode, or alternatively can be performed after the generation of the hashes for all of the clear text passcodes in the returned set or bin of clear text passcodes. The iterative execution can enhance computational performance of the client computing system since in most instances generation of hashes will only be performed for a subset of the clear text passcodes in the set or bin before a match is found.

Optionally at 718, the client computing system determines that the hashed passcode to be cracked has been successfully cracked in response to finding a match between the hashed passcode to be cracked and any one of the hashes of the clear text passcodes in the received set or bin of clear text passcodes. An appropriate message can be generated and/or returned.

The method 700 terminates or ends at 720, for example until invoked again. In some implementations, the method 700 may repeat continually or periodically.

The above description describes one method to crack hashes, specifically using rainbow tables+k-anonymity to look up cracked hashes over the network in a privacy-preserving way, denominated herein as a Privacy-Preserving Rainbow Table Lookups using k-Anonymity method.

One or more other methods of cracking hashes, performing passcode similarity checking, and risk scoring can be employed as part of, in addition to, or in lieu of, the above described Privacy-Preserving Rainbow Table Lookups using k-Anonymity method. These other methods can involve a combination of local processing and additional over-the network lookups.

Consider an end-user running a hash cracking program (i.e., processor-executable instructions executed by at least one processor). That hash cracking program has as an input a list or set of usernames: NTLM hash pairs, for example dumped or retrieved from an Active Directory. In this example an infosec team at a company is trying to assess the security of the passcodes of the company's employees as part of an Active Directory passcode audit.

The hash cracking program can use any one, more or all of the following methods to crack hashes. Advantageously, none of the following methods require intensive, complex or costly hardware, and each of the following methods is also advantageously privacy preserving and computationally efficient. The following described methods are set out in a preferred order, going from easiest to hardest. While a preferred order is provided, one of skill in the art will appreciate that the methods can be performed in a different order, and may be performed while omitting one or more of the described methods.

Method 1: Checking for Empty Passcodes

Figure 8:
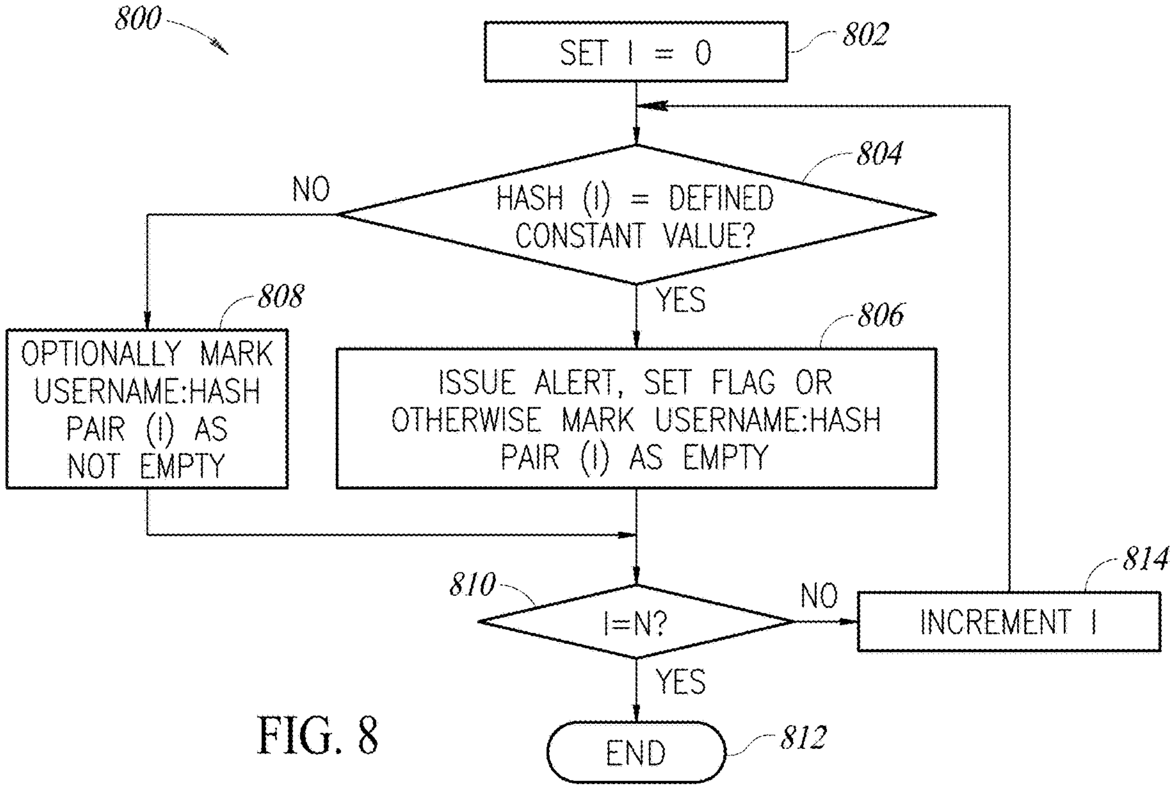
FIG. 8 is a flow diagram showing a method of operation of a client computing system to check for empty passwords, according to one illustrated implementation.

A method 800 of checking for empty passcodes is illustrated in FIG. 8 and described below, according to one illustrated implementation.

In this method, one or more processors check for the existence of empty passcodes, identifying any instances of empty passcodes. In the case of NTLM passcodes this is easy because the NLM hash of an empty passcode is a constant value 31d6cfe0d16ae931b73c59d7e0c089c0. Thus, for each username: hash pair in the list, one or more processors can determine whether the hash (e.g., NTLM hash) is equal to a defined constant value (e.g. 31d6cfe0d16ae931b73c59d7e0c089c0 for NTLM hash). The one or more processors determine that the passcode is empty if the hash is found to equal the constant.

At 802, the one or more processors initial a counter, for example setting an integer counter i equal to zero (0).

At 804, the one or more processors determine if the hash is equal the constant, indicating that the passcode is empty.

If the hash is equal the constant, then the one or more processors at 806 can issue an alert, set a flag or mark the corresponding username: hash pair as having an empty passcode. If the hash not is equal the constant, then optionally at 808 the one or more processors the corresponding username: hash pair as not having an empty passcode.

At 810, the one or more processors determine if all of the username: hash pair in the list have been assessed. If all the username: hash pair in the list have been assessed, the method 800 terminates at 812, for instance until invoked again. If all the username: hash pair in the list have not been assessed, the counter I is incremented at 814, and control returns to 804.

One of skill in the art will appreciate that other types of hashes and other constants can be employed in this method.

Method 2: Mutations or Variants Based on Usernames

Figure 9:
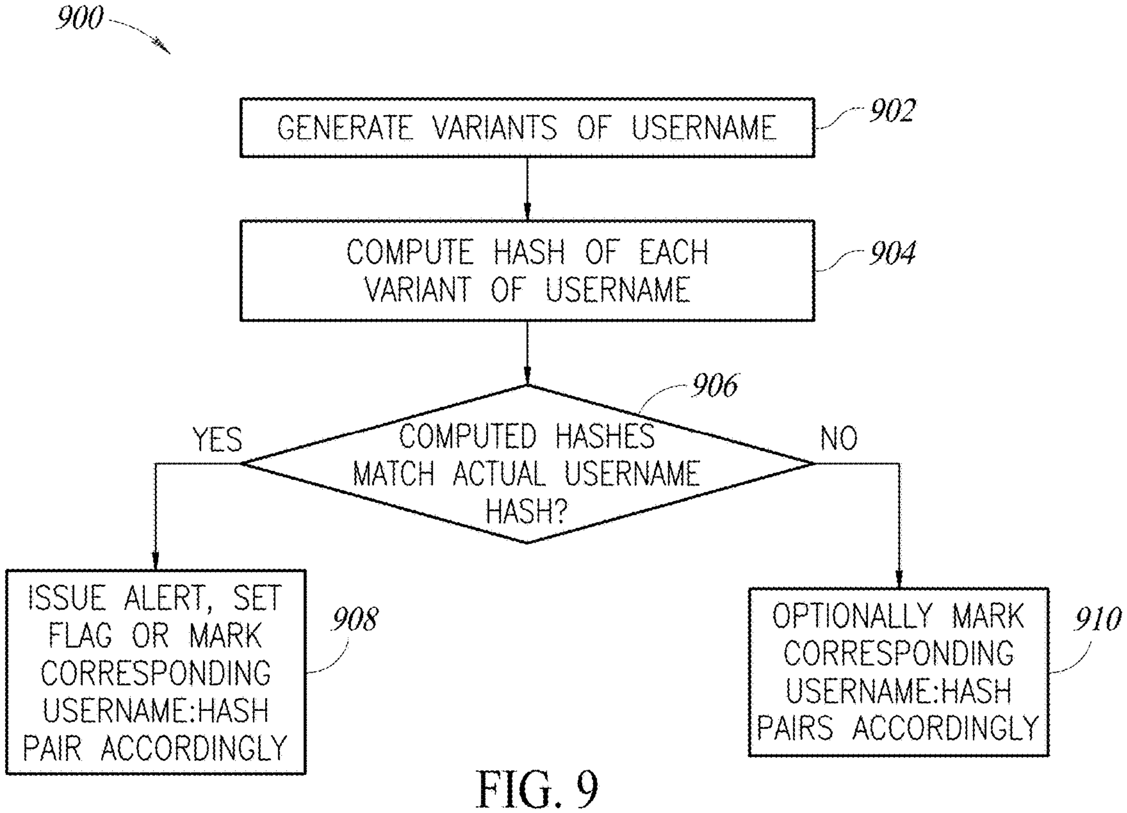
FIG. 9 is a flow diagram showing a method of operation of a client computing system to assess passwords based on mutations or variations of associated user names, according to one illustrated implementation.

A method 1000 of assessing passcodes based on mutations or variations of associated user names is illustrated in FIG. 9 and described below, according to one illustrated implementation.

It is common for at least a few passcodes in a large Active Directory audit to be derived from the corresponding username, especially for service accounts. In this method, one or more processors executing the hash cracking program locally generate mutations of each username, computes hashes (e.g., NTLM hashes) of the mutations and compares the computed hashes against the hashed passcode (e.g., NTLM hash passcode). If the processor(s) determines that there is a match, then the hash for that user may be considered as cracked or the passcode considered weak or otherwise vulnerable.

As an example, assume a username of jsmith.

At 902, the processor(s) locally generates variants of jsmith. This can be done using conventional mutation rules, for instance those used by hash crackers like best64, etc. (See https://www.trustedsec.com/blog/better-hacking-through-cracking-know-your-rules/here for more info on this topic.) The mutation rules can be stored locally or pulled or otherwise retrieved from a network service. Generating mutations is not a computationally n intensive process. For instance: jsmith jsmith1 JSMITH Jsmith JSMITH1 etc.

At 904, the processor(s) computes the hash (e.g., NTLM hash) of each of these variants of the username.

At 906, the processor(s) compares the computed hashes with the actual username hash to determine if there's a match.

If a match is found, then the hash for that user passcode is considered cracked or easily guessable or otherwise weak or vulnerable, and the one or more processors at 908 can issue an alert, set a flag or mark the corresponding username: hash pair as being cracked, easily guessable or otherwise weak or vulnerable. If a match is not found, then optionally at 910 the one or more processors the corresponding username: hash pair as not being cracked, easily guessable nor otherwise weak nor vulnerable.

One of skill in the art will appreciate that various types of hashes can be employed in this method. None of this is computationally intensive because the total list of context-sensitive terms is not expected to be large, maybe a couple hundred terms at most.

Method 3: Mutations Based on Context-Sensitive Terms and User-Provided Terms

Figure 10:
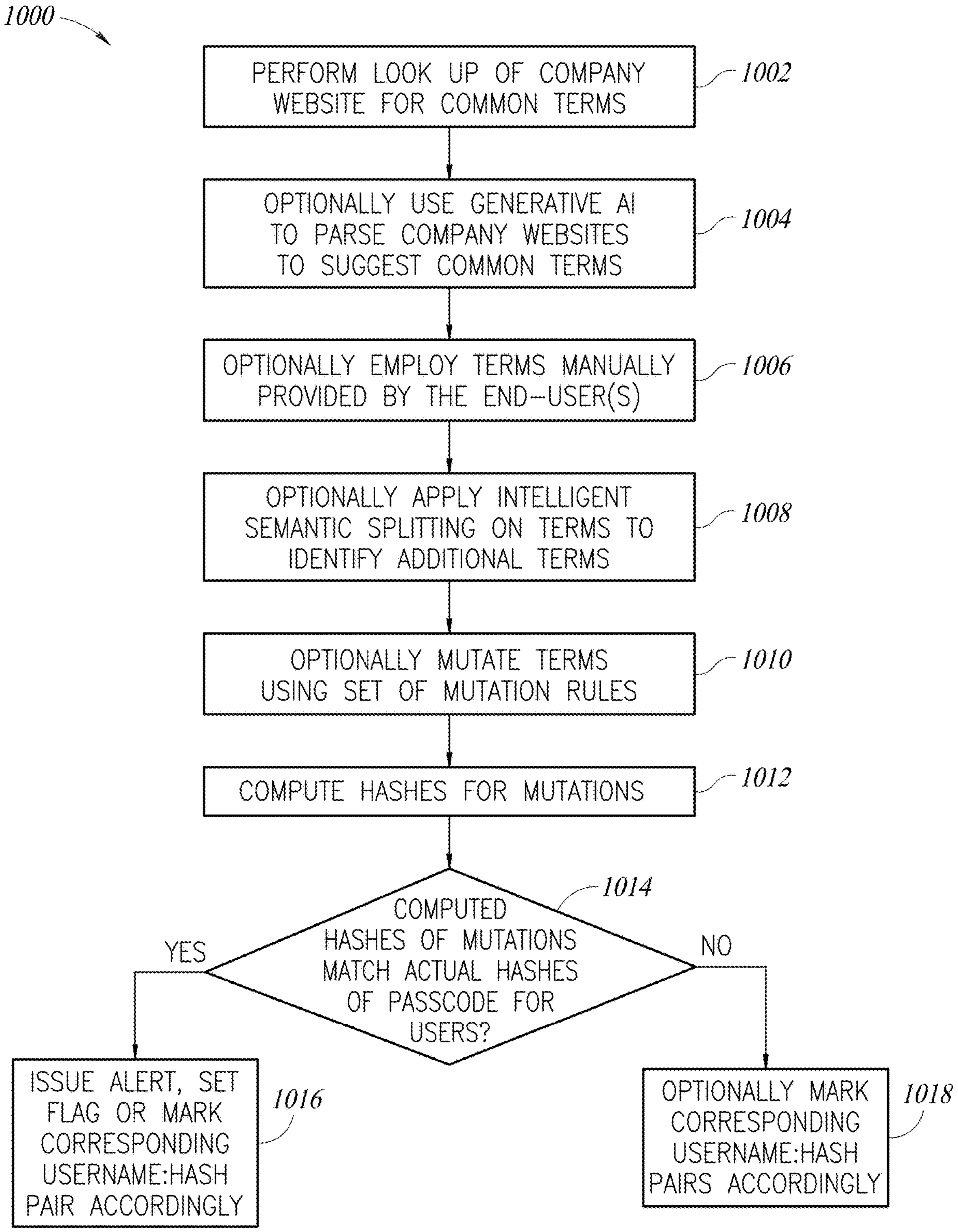
FIG. 10 is a flow diagram showing a method of operation of a client computing system to assess passwords based on variations of context-sensitive terms and/or user provided terms, according to one illustrated implementation.

A method 1000 of assessing passcodes based on variations of context-sensitive terms and/or user provided terms is illustrated in FIG. 10 and described below, according to one illustrated implementation.

Context-sensitive terms may be any term that is used or has a high probability of being used in light of the context. For example, employees of a specific company may have a tendency to use terms associated with the company in their passcodes. Also for examples, individuals residing in a certain geographic area may have a tendency to use terms related to that geographic area, for instance names of local sports teams, players, or physical locations or places. Thus, in this method, one or more processors inspect mutations of passcodes using context sensitive and/or user provided terms.

Thus, it is common for some user passcodes to be derived from terms or phrases associated with a company, for example, a user working at "ACME Corp" might have a passcode ACME123. Some examples of context sensitive terms include: —Company name(s), e.g. ACME—Company domain names, e.g. acme.com—Company LDAP domain, e.g. ACMECORP.COM—.

Various approaches can be employed to generate, identify, accesses or otherwise gather context-sensitive terms, for example context-sensitive terms specific to an organization.

At 1002, the one or more processors can perform a look up of the company Website to look for the common or most common words, such as company product names. There are off-the-shelf tools for performing this type of lookup, e.g., cewl https://www.kali.org/tools/cewl/.

Optionally at 1004, the one or more processors can additionally, or alternatively, employ generative artificial intelligence (AI) to parse company Websites and suggest common terms.

Optionally at 1006, the one or more processors can additionally, or alternatively, employ terms manually provided by the end-user(s).

Optionally at 1008, the one or more processors can apply intelligent semantic splitting on identified context-sensitive terms to identify additional likely context-sensitive terms. For example, if a company had a domain name AcmeFinance Ltd, the results of application of the intelligent semantic splitting might, for instance identify the following terms that should also be considered: Acme, Finance, AcmeFinance, eliminating terms that are too short in length or irrelevant like Ltd. There are commercially available natural language processing (NLP) libraries for term splitting, such as at github.com/keredson/wordninja.

Optionally at 1010, the one or more processors can additionally, or alternatively, mutate the identified context-sensitive and/or user supplied terms using a set of mutation rules, in a similar fashion to that described above with respect to mutating usernames.

At 1012, the one or more processors can generate or compute hashes for the mutations of the identified context-sensitive and/or user supplied terms.

At 1014, the one or more processors can then compare the generated or computed hashes of the mutations with the actual hashes of the passcode for the user accounts to check for a match.

If a match is found, then the hash for that user passcode is considered cracked or easily guessable or otherwise weak, and the one or more processors at 1016 can issue an alert, set a flag or mark the corresponding username: hash pair as being cracked, easily guessable or otherwise weak. If a match is not found, then optionally at 1018 the one or more processors the corresponding username: hash pair as not being cracked, easily guessable nor otherwise weak.

One of skill in the art will appreciate that various types of hashes can be employed in this method. None of this is computationally intensive because the total list of context-sensitive terms is not expected to be large, maybe a couple hundred terms at most.

Method 4: Credential Stuffing

Figure 11:
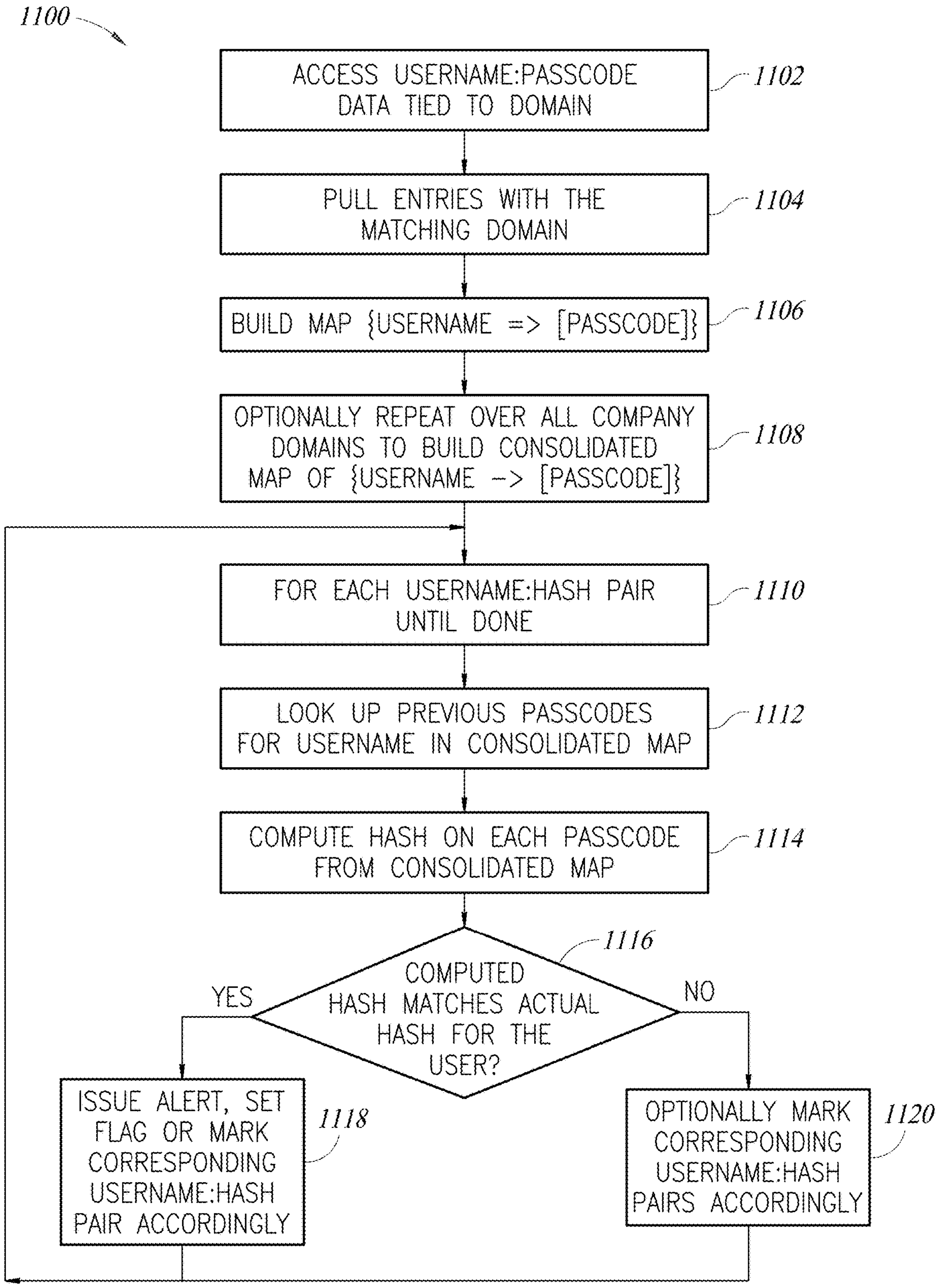
FIG. 11 is a flow diagram showing a method of operation of a client computing system to detect credential stuffing, according to one illustrated implementation.

A method 1100 of detecting credential stuffing, is illustrated in FIG. 11 and described below, according to one illustrated implementation.

Credential stuffing is a type of attack in which an attacker takes previously breached passcodes for a specific user or user account and attempts to login with the breached passcodes to gain access as the user to the corresponding user account.

At 1102, one or more processors (e.g., local one or more processors) retrieve or otherwise access username: passcode data tied to a domain. To retrieve or otherwise access such, the domain itself can be hashed and prefixed (e.g., using the k-anonymity method described above), and the prefix used to query a service over a network for all breach data tied to any domains matching that prefix. The network service can, for example, index breach data by the prefix (sha256 (domain)) function, and the data at each prefix contains entries for all <username>@<domain>: <passcode> combinations with a matching domain prefix.

At 1104, when the data is retrieved, returned or otherwise accessed, the local processor(s) goes through all the entries and pulls out or selects the entries with the matching domain.

At 1106, the processor(s) then builds a map {username=> [passcode]}.

Optionally at 1108, the processor(s) build a consolidated map of {username-> [passcode]}, for example by repeating the accessing 1102, the pulling or selecting 1104 and the map building 1106 over multiple possible company domains.

At 1110, the processor(s) can execute a loop, iterating through each username: hash pair (e.g., username: NTLM hash pair) that the processor(s) is attempting to crack.

In this loop, at 1112 the processor(s) looks up previously disclosed passcodes for that username in the consolidated map. In this loop, at 1114 the processor(s) then generates or computes a hash (e.g., an NTLM hash) on each passcode from the consolidated map. In this loop, at 1116 the processor(s) then compares the generated or computed hash to the actual hash (e.g., actual NTLM hash) for the user to check for a match. In this loop, if a match is found, then the hash for that user passcode is considered cracked or easily guessable or otherwise weak. In this loop, if a match is found the one or more processors at 1118 can issue an alert, set a flag or mark the corresponding username: hash pair as being cracked, easily guessable or otherwise weak. In this loop, if a match is not found, then optionally at 1120 the one or more processors the corresponding username: hash pair as not being cracked, easily guessable nor otherwise weak.

One of skill in the art will appreciate that various types of hashes can be employed in this method.

This method can provide additional benefit beyond only relying on rainbow table lookups across all breached passcodes. The method directly relates to risk scoring because compromising accounts using passcodes tied to a specific user or user account is significantly easier than guessing across a huge set of breached passcodes. This method can server as a basis for the following method, denominated as: Credential Tweaking.

One of skill in the art will appreciate that various types of hashes can be employed in this method.

Method 5: Credential Tweaking

Figure 12:
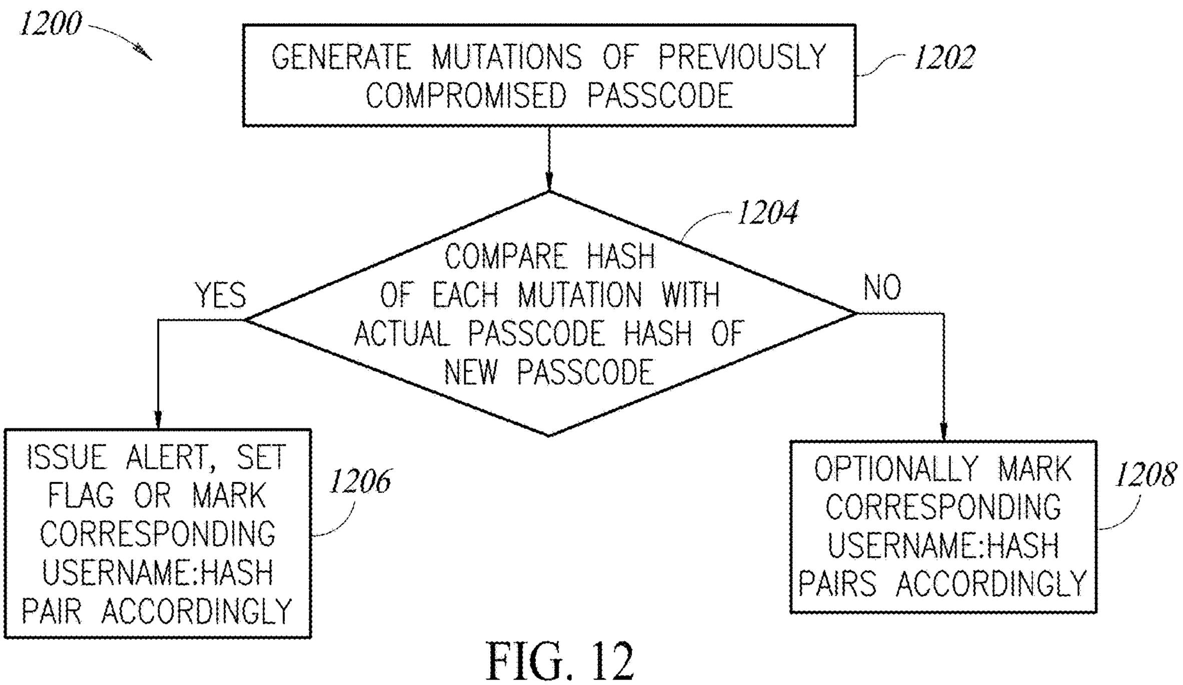
FIG. 12 is a flow diagram showing a method of operation of a client computing system to assess variations of previously compromised passwords, for example mutations of previously compromised passwords, according to one illustrated implementation.

A method 1200 of assessing variations of previously compromised passcodes, for example mutations of previously compromised passcodes, is illustrated in FIG. 12 and described below, according to one illustrated implementation.

This type of attack using variations of comprised passcodes is known as credential tweaking.

Assuming access to a consolidated map of prior breached passcodes for usernames tied to a domain, for example from the Credential Stuffing method 1100 (FIG. 11) discussed above, the processor(s) can check variations of previously compromised passcodes, in addition to the checking for exact passcode matches.

For example, assume a user account jsmith@acme.com had a previously compromised passcode of Acme123. Later on the user changes their passcode for the corresponding user account. In the Credential Stuffing method 1100 (FIG. 11) discussed above, the processor(s) would have attempted to check if the hash of the compromised passcode (e.g., NTLM (Acme123)) matched the passcode hatch (e.g., jsmith's NTLM hash) for the new passcode of the user or user account.

In this Credential Tweaking method 1200, the one or more processors (e.g., local processor(s)) also generate mutations of Acme123 at 1202, for example: Acme1234, Acme123!, etc., for instance using mutation rules as described in the Mutations Based on Usernames method 1000 (Figure) discussed above.

At 1204, the processor(s) compare the hash (e.g., NTLM hash) of each mutation with the actual passcode hash (e.g., actual NTLM hash) of the new or changed passcode for the user or user account (e.g., jsmith@acme.com) to determine whether the user changed their passcode to something that is easily guessable or otherwise considered to be a weak passcode based of their previous passcode.

At 1206, if a match is found (i.e., it is determined that the user changed their passcode to something easily guessable or otherwise weak based on their previous passcode), the one or more processors can issue an alert, set a flag indicating such, or otherwise mark the corresponding username: hash pair as being cracked, easily guessable or otherwise weak.

At 1208, if a match is not found (i.e., it is determined that the user changed their passcode to something that is not easily guessable based of their previous passcode), the one or more processors can optionally mark the corresponding username: hash pair as not being cracked, easily guessable nor otherwise weak.

One of skill in the art will appreciate that various types of hashes can be employed in this method.

Method 6: Privacy-Preserving Rainbow Table Lookups Using k-Anonymity

This hash cracking method is described above with reference to FIGS. 3-7, and discussion of which will not be repeated in the interest of brevity.

Method 7: Variations of Cracked Passcodes

Figure 13:
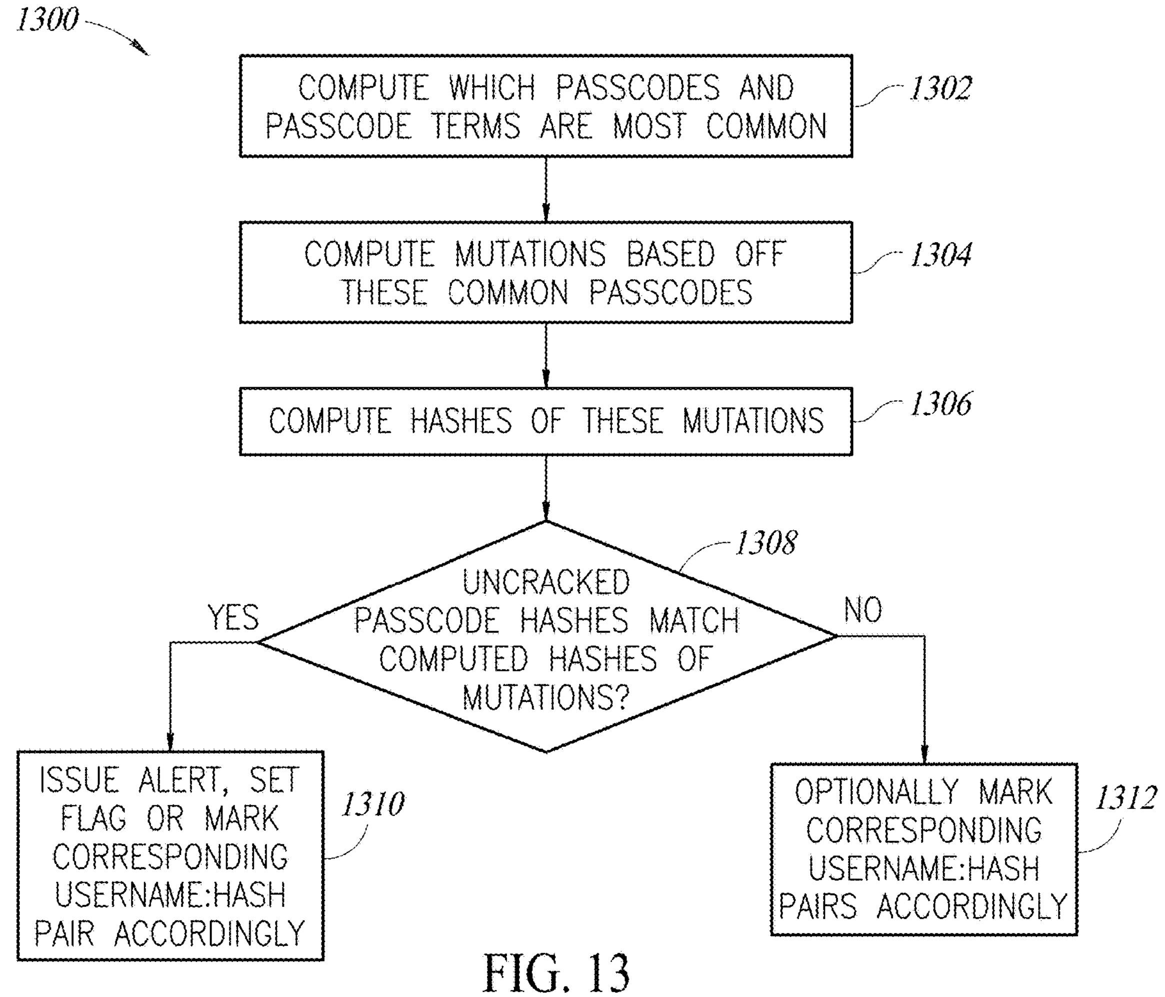
FIG. 13 is a flow diagram showing a method of operation of a client computing system to assess variations of passwords, for example mutations of common passwords, according to one illustrated implementation.

A method 1300 of assessing variations of passcodes, for example mutations of common passcodes, is illustrated in FIG. 13 and described below, according to one illustrated implementation.

After going through the various methods described above, a certain number of user passcodes would likely have been cracked. At 1302, using this set of cracked passcodes, one or more processors can compute which passcodes and passcode terms are most common.

At 1304, the processor(s) can compute mutations based off these common passcodes, for instance as in the above described the Mutations Based on Usernames method 900 (FIG. 9).

At 1306, the processor(s) can generate or compute hashes of these mutations.

At 1308, the processor(s) compare the generated or computed hashes of the mutations to uncracked passcode hashes (e.g., user NTLM hashes) to determine if there are more matches. For instance, assume a few users at ACME Corporation had a passcode like Celtics1, perhaps because ACME is based in Boston. Based on this the processor(s) compute or generate variations of the passcode (e.g., Celtics1) for example celtics1, Cletics!, etc. The processor(s) attempts to hash the computed or generated variations of the passcode. The processor(s) compares the computed or generated variations of the passcode against all other passcodes. This can lead to cracking other passcodes users have, for instance Celtics123 or Celtics1!.

If a match is found then the hash for that user passcode or variations thereof is considered cracked or easily crackable. At 1310, the one or more processors can issue an alert or set a flag if a match is found (i.e., hash is cracked), or otherwise mark the corresponding username: hash pair as being cracked or easily crackable or otherwise weak.

Optionally at 1312, the processor(s) can mark the corresponding username: hash pair as not being cracked or easily crackable nor otherwise weak.

One of skill in the art will appreciate that various types of hashes can be employed in this method.

Passcode Similarity Calculations

Figure 14:
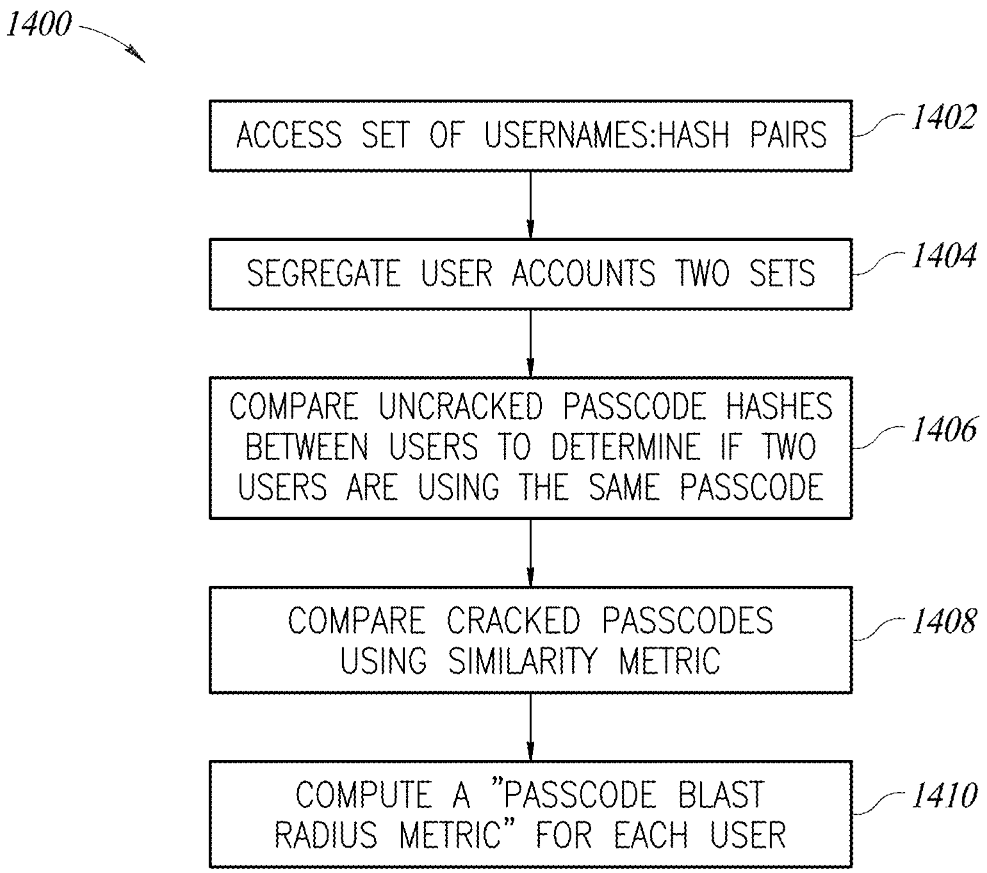
FIG. 14 is a flow diagram showing a method of operation of a client computing system to perform risk assessment, for example based on password similarity, according to one illustrated implementation.

Credential/passcode reuse is a common tactic attackers employ to compromise user accounts. Knowing one user's compromised passcode, an attacker can attempt that exact passcode or mutations of that passcode to login as other users. So, in addition to assessing passcode strength using the various cracking methods described above, it would be beneficial to assess how similar passcodes in an organization are to each other as part of overall risk assessment and/or scoring. A method 1400 of risk assessment, for example based on passcode similarity, is illustrated in FIG. 14 and described below, according to one illustrated implementation.

As described above, at 1402 a processor executing a hash cracking program can receive or otherwise access a list of usernames: hash pairs (e.g., usernames: NTLM hash pairs) as an input, for example dumped from an Active Directory. Once the processor has completed one, more or even all of the methods described above, the processor can optionally compute how similar user passcodes are to each other. For example, at 1404 the processor can generate or segregate the users into two sets of users: a first set comprising users whose passcodes it has cracked or who are otherwise employing weak or easily guessable passcodes, and a second set comprising users whose passcodes were not cracked and who are not employing weak or easily guessable passcodes.

At 1406, for passcodes that were not cracked, an exact comparison of passcode hashes (e.g., NTLM hashes) between users can be used to determine if two users are using the same passcode. This is possible if the hashes are unsalted (e.g., NTLM hashes). Thus, knowing the cleartext passcode is not required to know if two users are using the same passcode.

At 1408, for passcodes that were cracked the processor(s) can compare cracked passcodes using similarity metric. For example, a metric called the normalized damerau levenshtein distance can be computed and employed to compare all passcodes with each other to see how "close" they are to one another. If two passcodes are within a certain defined distance, the two passcodes are considered similar. See: github.com/lanl/pyxDamerauLevenshtein/blob/master/README.md.

At 1410, the processor(s) can employ the metric to compute a "passcode blast radius metric" for each user. The "passcode blast radius metric" indicates, for a given a user and the user's cracked passcode (or uncracked hash), how many other users have similar passcodes or the exact same passcode. This metric is useful for assessing how many additional users can be compromised if a given user is compromised.

Risk Scoring

Once the processor has completed one, more or even all of the methods described above, the processor can optionally determine an assessed overall risk of a user based on their passcode. The assessed overall risk can be based on one, more or all of the following factors.

i) Is the user disabled or enabled? If the user is disabled the risk is lowered, almost to 0.
ii) Was the user's passcode cracked? Yes means higher risk.
iii) Which method was used to crack the user's passcode? If it was methods 1-5 above, that means the user's passcode is easily guessable and puts the user at critical risk.
iv) What is the user's passcode blast radius? High blast radius means more risk.
v) User groups and permissions. Is the user a domain admin or part of the IT Operations team, or does the user have access to certain sensitive data? That elevates the risk.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary media production systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via microprocessors with one or more cores or central processing units (CPUs). However, those skilled in the art will recognize that the embodiments disclosed herein, in whole or in part, can be equivalently implemented in integrated circuits, as one or more computer programs running on one or more computers (e.g., as one or more programs running on one or more computing systems), as one or more programs running on or executed by one or more processors (e.g., microprocessors, microcontrollers, central processing units, graphics processing units digital signal processing units, application specific integrated circuits, field programmable gate arrays), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as, hard disk drives, DVD-ROMs, flash memory, and computer memory; and other non-transitory computer-readable storage media.

The various implementations described above can be combined to provide further implementations.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a processor-based computing system, the method comprising:

generating, via a second hash function, a hash of a hashed passcode to be cracked, wherein the hashed passcode to be cracked was hashed with a first hash function;

sending a query specifying a prefix portion of the hash of the hashed passcode to be cracked;

receiving at least a set of clear text passcodes that correspond to the prefix portion of the hash of the hashed passcode to be cracked; and determining whether there is a match between the hashed passcode to be cracked and any hashes of the clear text passcodes in the received set of clear text passcodes.

2. The method of claim 1, further comprising:

generating a hash of all clear text passcodes in the received set of clear text passcodes via the first hash function.

3. The method of claim 2, wherein determining whether there is the match between the hashed passcode to be cracked and any hashes of the clear text passcodes in the received set of clear text passcodes comprises:

determining whether there is the match between the hashed passcode to be cracked and any of the generated hashes of the clear text passcodes in the received set of clear text passcodes via the first hash function.

4. The method of claim 1, wherein receiving at least the set of clear text passcodes that correspond to the prefix portion of the hash of the hashed passcode to be cracked comprises:

receiving the set of clear text passcodes that correspond to the prefix portion of the hash of the hashed passcode to be cracked along with a respective hashed passcode for each of the clear text passcodes of the set of clear text passcodes.

5. The method of claim 4, wherein determining whether there is the match between the hashed passcode to be cracked and any hashes of the clear text passcodes in the received set of clear text passcodes comprises:

determining whether there is the match between the hashed passcode to be cracked and any of the received respective hashed passcode for each of the clear text passcodes of the set of clear text passcodes.

6. The method of claim 1, wherein generating the hash of the hashed passcode via the second hash function comprises:

generating the hash of the hashed passcode via the second hash function, wherein the second hash function is a different hash function than the first hash function.

7. The method of claim 1, wherein generating the hash of the hashed passcode via the second hash function comprises:

generating the hash of the hashed passcode via the second hash function, wherein the second hash function is a same hash function as the first hash function.

8. The method of claim 1, further comprising:

generating the hashed passcode to be cracked via the first hashing function.

9. The method of claim 1, wherein receiving at least the set of clear text passcodes that correspond to the prefix portion of the hash of the hashed passcode to be cracked comprises:

receiving a plurality of clear text passcodes that each have in common the prefix portion of the hash of the hashed passcode.

10. The method of claim 1, wherein receiving at least the set of clear text passcodes that correspond to the prefix portion of the hash of the hashed passcode to be cracked comprises:

receiving a plurality of clear text passcodes that each have in common a plurality of places of a hexadecimal representation of the prefix portion of the hash of the hashed passcode.

11. The method of claim 1, further comprising:

determining that the hashed passcode to be cracked has been cracked in response to finding the match between the hashed passcode to be cracked and any one of the hashes of the clear text passcodes in the received set of clear text passcodes.

12. The method of claim 1, wherein sending the query specifying the prefix portion of the hashed passcode to be cracked comprises:

sending the query specifying the prefix portion of the hashed passcode to be cracked by a client application executing on a client computing system to a server system, wherein the receiving at least the set of clear text passcodes that correspond to the prefix portion of the hash of the hashed passcode to be cracked comprises:

receiving, from the server system and by the client application executing on the client computing system, at least the set of clear text passcodes that correspond to the prefix portion of the hash of the hashed passcode to be cracked.

13. A processor-based computing system, comprising:

at least one processor; and at least one nontransitory processor-readable medium communicatively coupled to the at least one processor, wherein the at least one nontransitory processor-readable medium stores processor-executable instructions which, when executed by the at least one processor, cause the at least one processor to:

generate, via a second hash function, a hash of a hashed passcode to be cracked, wherein the hashed passcode to be cracked was hashed with a first hash function;

send a query specifying a prefix portion of the hash of the hashed passcode to be cracked;

receive at least a set of clear text passcodes that correspond to the prefix portion of the hash of the hashed passcode to be cracked; and determine whether there is a match between the hashed passcode to be cracked and any hashes of the clear text passcodes in the received set of clear text passcodes.

14. The processor-based computing system of claim 13, wherein, when executed, the processor-executable instructions cause the at least one processor further to:

generate a hash of all clear text passcodes in the received set of clear text passcodes via the first hash function.

15. The processor-based computing system of claim 14, wherein, to determine whether there is the match between the hashed passcode to be cracked and any hashes of the clear text passcodes in the received set of clear text passcodes, when executed, the processor-executable instructions cause the at least one processor to:

determine whether there is the match between the hashed passcode to be cracked and any of the generated hashes of the clear text passcodes in the received set of clear text passcodes via the first hash function.

16. The processor-based computing system of claim 13, wherein, to receive at least the set of clear text passcodes that correspond to the prefix portion of the hash of the hashed passcode to be cracked, when executed, the processor-executable instructions cause the at least one processor to:

receive the set of clear text passcodes that correspond to the prefix portion of the hash of the hashed passcode to be cracked along with a respective hashed passcode for each of the clear text passcodes of the set of clear text passcodes.

17. The processor-based computing system of claim 16, wherein, to determine whether there is the match between the hashed passcode to be cracked and any hashes of the clear text passcodes in the received set of clear text passcodes, when executed, the processor-executable instructions cause the at least one processor to:

determine whether there is the match between the hashed passcode to be cracked and any of the received respective hashed passcode for each of the clear text passcodes of the set of clear text passcodes.

18. The processor-based computing system of claim 13, wherein, to generate the hash of the hashed passcode via the second hash function, when executed, the processor-executable instructions cause the at least one processor to:

generate the hash of the hashed passcode via the second hash function, wherein the second hash function is a different hash function as the first hash function.

19. The processor-based computing system of claim 13, wherein, to generate the hash of the hashed passcode via the second hash function, when executed, the processor-executable instructions cause the at least one processor to:

generate the hash of the hashed passcode via the second hash function, wherein the second hash function is a same hash function as the first hash function.

20. The processor-based computing system of claim 13, wherein, when executed, the processor-executable instructions cause the at least one processor further to:

generate the hashed passcode to be cracked via the first hashing function.

21. The processor-based computing system of claim 13, wherein, to receive at least the set of clear text passcodes that correspond to the prefix portion of the hash of the hashed passcode to be cracked, when executed, the processor-executable instructions cause the at least one processor to:

receive a plurality of clear text passcodes that each have in common the prefix portion of the hash of the hashed passcode.

22. The processor-based computing system of claim 13, wherein, to receive at least the set of clear text passcodes that correspond to the prefix portion of the hash of the hashed passcode to be cracked, when executed, the processor-executable instructions cause the at least one processor to:

receive a plurality of clear text passcodes that each have in common a plurality of places of a hexadecimal representation of the prefix portion of the hash of the hashed passcode.

23. The processor-based computing system of claim 13, wherein, when executed, the processor-executable instructions cause the at least one processor further to:

determine that the hashed passcode to be cracked has been cracked in response to finding the match between the hashed passcode to be cracked and any one of the hashes of the clear text passcodes in the received set of clear text passcodes.

24. The processor-based computing system of claim 13, wherein, to send the query specifying the prefix portion of the hashed passcode to be cracked, when executed, the processor-executable instructions cause the at least one processor to:

send the query specifying the prefix portion of the hashed passcode to be cracked by a client application executing on a client computing system to a server system, and, to receive at least the set of clear text passcodes that correspond to the prefix portion of the hash of the hashed passcode to be cracked, when executed, the processor-executable instructions cause the at least one processor to:

receive, from the server system by the client application executing on the client computing system, at least the set of clear text passcodes that correspond to the prefix portion of the hash of the hashed passcode to be cracked.

* * * * *